(12) United States Patent
Chu et al.

(10) Patent No.: US 12,371,059 B1
(45) Date of Patent: Jul. 29, 2025

(54) DETERMINING SCENE SIMILARITY

(71) Applicant: Zoox, Inc., Foster City, CA (US)

(72) Inventors: Eric Yan Tin Chu, San Jose, CA (US); Andrew Glen Tsao, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 447 days.

(21) Appl. No.: 17/816,160

(22) Filed: Jul. 29, 2022

(51) Int. Cl.
*B60W 60/00* (2020.01)
*G07C 5/08* (2006.01)

(52) U.S. Cl.
CPC ......... *B60W 60/0015* (2020.02); *G07C 5/085* (2013.01); *B60W 2552/35* (2020.02); *B60W 2552/53* (2020.02); *B60W 2554/4042* (2020.02); *B60W 2554/4043* (2020.02); *B60W 2554/4044* (2020.02); *B60W 2555/60* (2020.02)

(58) Field of Classification Search
USPC .................................................... 701/23–28
See application file for complete search history.

(56) References Cited

U.S. PATENT DOCUMENTS

| | | | | |
|---|---|---|---|---|
| 11,195,418 | B1* | 12/2021 | Hong | G05D 1/0278 |
| 12,065,140 | B1* | 8/2024 | Pronovost | B60W 40/04 |
| 2008/0147309 | A1* | 6/2008 | Ivansson | G05D 1/106 |
| | | | | 701/4 |
| 2015/0286873 | A1* | 10/2015 | Davis | G06F 1/1694 |
| | | | | 382/103 |
| 2018/0144496 | A1* | 5/2018 | Posner | G06T 7/73 |
| 2019/0271549 | A1* | 9/2019 | Zhang | G01C 21/20 |
| 2020/0081134 | A1* | 3/2020 | Wheeler | G01S 19/396 |
| 2020/0103523 | A1* | 4/2020 | Liu | G01S 13/87 |
| 2020/0200547 | A1* | 6/2020 | Miller | G01C 21/3815 |
| 2020/0377105 | A1* | 12/2020 | Murashkin | B60W 40/04 |
| 2021/0004012 | A1* | 1/2021 | Marchetti-Bowick | |
| | | | | G05D 1/0221 |
| 2021/0146963 | A1* | 5/2021 | Li | G06N 20/00 |
| 2021/0276598 | A1* | 9/2021 | Amirloo Abolfathi | |
| | | | | B60W 30/09 |
| 2022/0092973 | A1* | 3/2022 | Mohamad Alizadeh Shabestary | G08G 1/08 |
| 2022/0161822 | A1* | 5/2022 | Fonseca | G05D 1/0088 |
| 2022/0214444 | A1* | 7/2022 | Das | G01S 17/50 |
| 2022/0292543 | A1* | 9/2022 | Henderson | G06Q 30/0252 |
| 2022/0301182 | A1* | 9/2022 | Mahjourian | G06T 7/20 |
| 2023/0245336 | A1* | 8/2023 | Fonseca | G06T 7/20 |
| | | | | 382/100 |
| 2023/0264708 | A1* | 8/2023 | Lacaze | G05D 1/695 |
| | | | | 701/23 |

\* cited by examiner

*Primary Examiner* — Jonathan L Sample
(74) *Attorney, Agent, or Firm* — Lee & Hayes, P.C.

(57) ABSTRACT

Techniques for analyzing driving scenarios are discussed herein. For example, techniques may include determining, based at least in part on log data representing a scenario of the vehicle operating in an environment, a plurality of frames of the scenario. For individual frames, the techniques may determine a respective set of discrete areas of the environment based on a respective position of the vehicle in the frame, determine a respective set of labels for the discrete areas for the individual frame, determine respective agent feature values of agent features for agents in individual discrete areas of the discrete areas of the individual frame, and determine a feature vector for the scenario by aggregating agent feature values of the individual frames based on the labels for the discrete areas for the frame. An action may then be performed based at least in part on the feature vector.

20 Claims, 11 Drawing Sheets

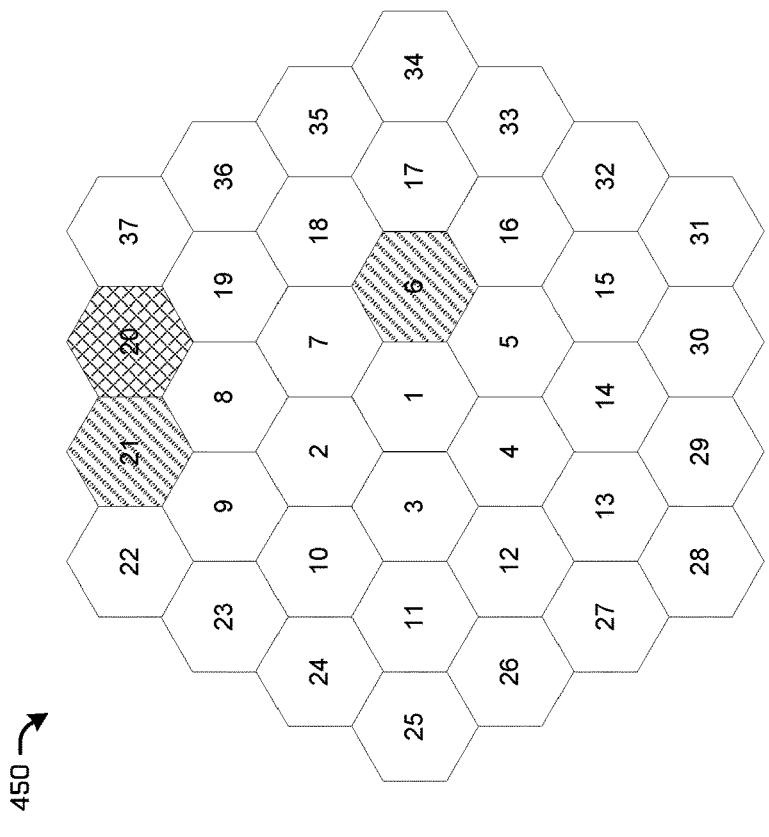
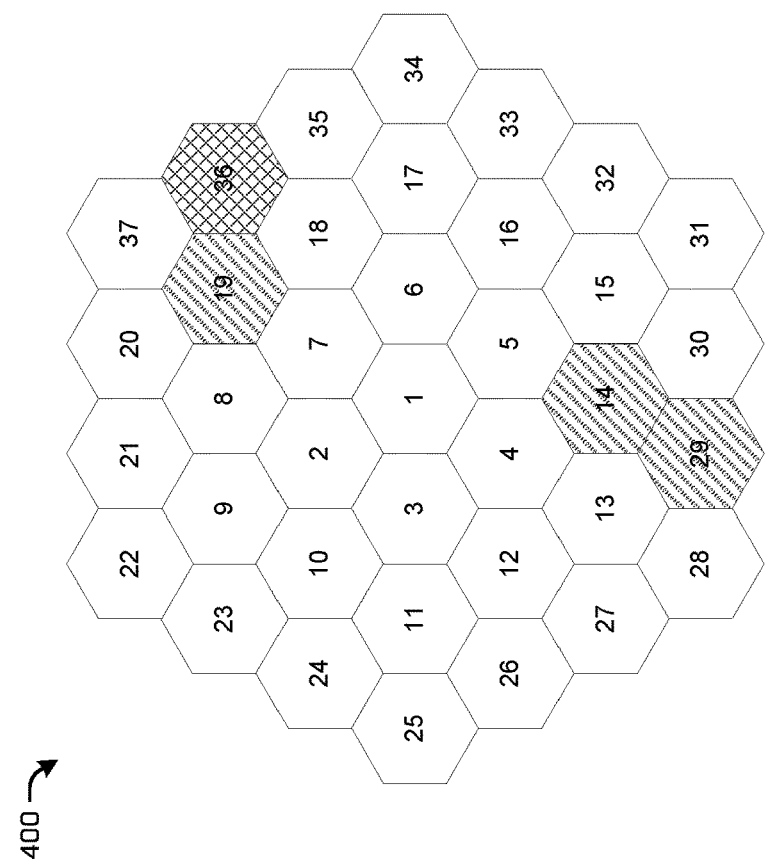
FIG. 4B
FIG. 4A

DETERMINING SCENE SIMILARITY

BACKGROUND

Autonomous vehicles may define routes and navigate along routes partially or entirely without the assistance of a human driver. Various driving simulation systems have been developed to assist with testing, updating, and maintaining operational software and hardware of autonomous vehicles, to ensure the safety and reliability of the vehicles prior to deployment. Simulated data and driving simulation systems can be used to test and validate features of autonomous vehicle systems, including features and functionalities that may be otherwise prohibitive to test in the real world due to safety concerns, time limitations, repeatability, and the like. For example, simulation systems may perform simulations based on driving scenarios to test and improve passenger safety, vehicle decision-making, sensor data analysis, and route optimization. However, classification of driving scenarios and related driving simulations may be challenging, in that some scenarios that appear visually similar may be quite different from the perspective of the sensor data analysis and decision-making systems of the vehicle, while other scenarios that appear visually different may be similar from the perspective of these vehicle systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4A illustrates an example diagram of a heatmap for the vehicle agent presence feature of the feature vector determined for the scenario represented by FIGS. 3A-3D, in accordance with embodiments of the disclosure.

FIG. 4B illustrates an example diagram of a heatmap for the pedestrian agent presence feature of the feature vector determined for the scenario represented by FIGS. 3A-3D, in accordance with embodiments of the disclosure.

DETAILED DESCRIPTION

Figure 1:
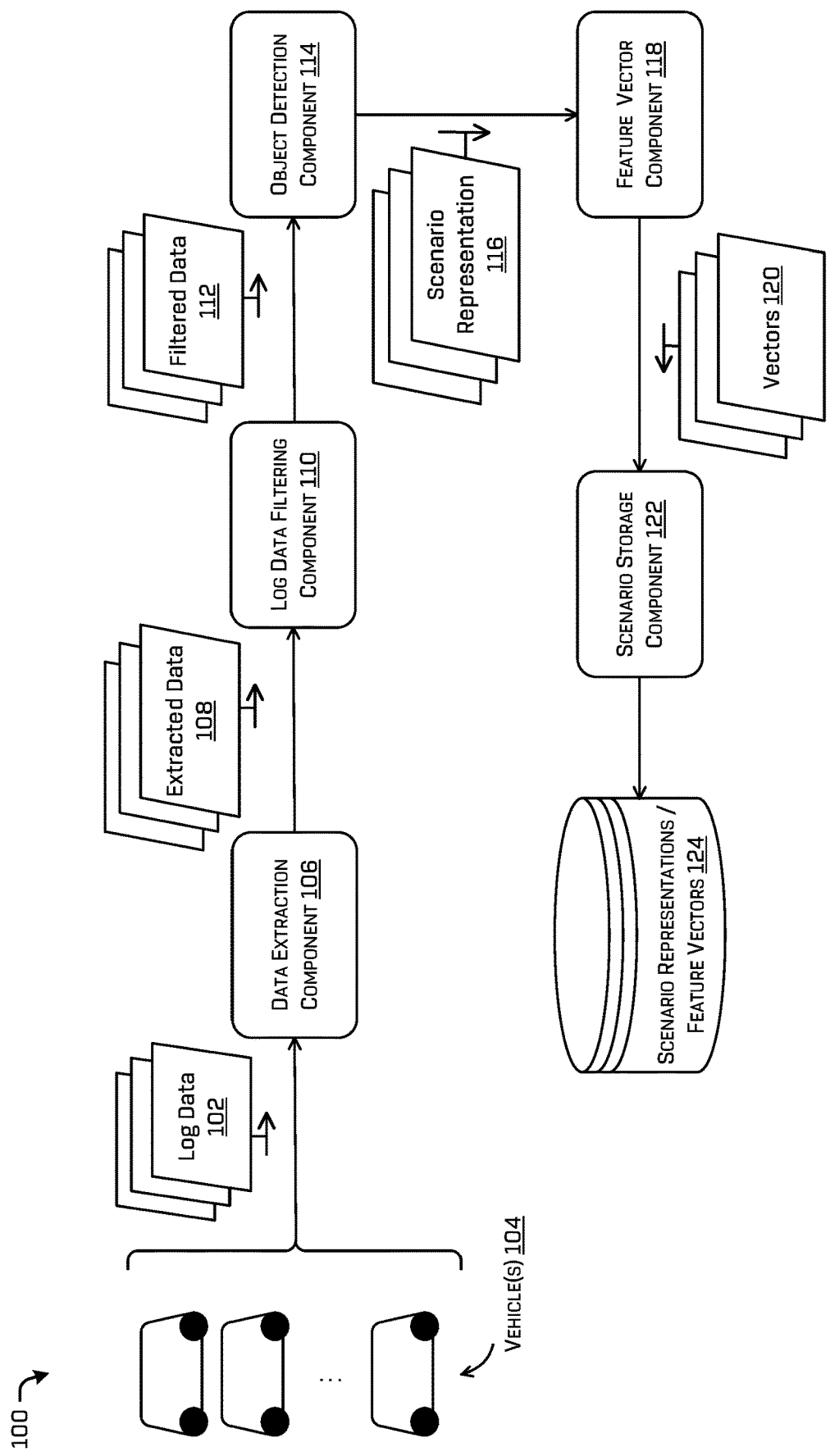
FIG. 1 illustrates an example block-diagram illustrating an example architecture of a scenario analysis system configured to generate feature vectors usable in determining similar driving scenarios based on an input scenario representations of a driving scenario, in accordance with implementations of the disclosure.

Autonomous vehicles may navigate through physical environments along planned routes or paths. For example, when an autonomous vehicle receives a request to travel to a destination location, the autonomous vehicle may navigate along a planned path from the current location of the autonomous vehicle to a pickup location to pick up a passenger and then from the pickup location to the destination location. While navigating, the autonomous vehicle may encounter dynamic objects (e.g., vehicles, pedestrians, animals, and the like) and/or static objects (e.g., buildings, signage, and the like) in the environment. In order to ensure the safety of the occupants and objects, the decisions and reactions of the autonomous vehicles to events and situations that the vehicle may encounter can be modeled and simulated using a plurality of driving scenarios.

A scenario may refer to a real or virtual environment in which an autonomous vehicle may operate over a period of time. Within driving simulation systems, scenarios may be represented as virtual environments in which the software-based systems and features of autonomous vehicles may be tested and validated. Within real-world environments, scenarios can be represented by static and dynamic objects in the physical environment proximate to a vehicle. For scenarios represented in real or virtual environments, the scenarios may include the data representing a road configuration around the vehicle, road conditions, weather conditions, lighting conditions, and various relevant objects in the environment. For instance, data representing a scenario may include object types, positions, velocities, and other state data for the vehicle itself and for any number of additional static and/or dynamic objects proximate to the vehicle in the environment. Additionally, scenario data may include a representation of the environment over a period of time, rather than a single snapshot of the environment, so that the vehicle systems may receive the scenario as input data, detect changes in the environment over time, and perform one or more driving decisions/determinations based on a predicted future state of the environment.

When testing and validating the systems and features of fully autonomous or semi-autonomous vehicles, it may be valuable to determine additional scenarios that are similar to an input scenario. For instance, when a certain vehicle behavior is observed during one scenario, a driving simulation system may attempt to analyze, isolate, or replicate vehicle behavior in other, similar scenarios. Similar scenarios may be targeted for simulation testing to determine the breadth and/or exposure of particular vehicle behaviors, such as system failures and/or software updates. Additionally, when a particular failure or other vehicle behavior is observed in one scenario, it may be valuable to understand how frequently the same failure or behavior is likely to occur during real-world driving situations.

However, there are technical challenges associated with identifying or generating similar scenarios based on an initial input scenario. For instance, systems that analyze scenarios based solely on the visual characteristics of the environment may fail to detect relevant similar scenarios that may be valuable for testing and validation purposes. For instance, driving scenarios that appear visually similar are often analyzed and processed very differently by the systems and features of autonomous vehicles. As an example, two scenarios may be visually identical except for a minor difference in the classification of an object type, or a small change in position or velocity of an agent, but such minor differences in the environment may cause an autonomous vehicle to execute entirely different operations and/or perform in very ways in response to these different scenarios. Similarly, other scenarios that may appear visually quite different may be classified and analyzed in a similar or identical manner by the autonomous vehicle systems. For instance, two scenarios that have significant differences in the positions, velocities, and other characteristics of several objects in their respective environments may produce large visual differences between the scenarios, but these differences may be irrelevant to autonomous vehicle systems, which may respond similarly to the scenarios based on other shared commonalities of the scenarios.

The techniques described herein can address technical challenges of identifying similar driving scenarios that may be encountered by autonomous vehicles and may improve on conventional systems. In various examples described herein, a scenario analysis system may receive input data representing a driving scenario and determine a feature vector representation of the agents and road features associated with the scenario. Agents may include objects that may move or are otherwise impermanent such as vehicles, pedestrians, animals, road debris, traffic cones, pot holes, and the like. Road features may include information about the area surrounding the autonomous vehicle, such as whether an area is a drivable surface, a crosswalk, before an intersection, an intersection, after an intersection, and so on.

In some examples, sensors of an autonomous vehicle (also referred to hereinafter as subject vehicle) can capture sensor data of an environment, which may include agents separate from the autonomous vehicle, such as other vehicles or pedestrians. A scenario analysis system may receive the sensor data and generate a representation of the environment based at least in part on the sensor data and road network data. The scenario analysis system may then generate a feature vector representing the scenario based on the representation of the environment. The feature vector may then be stored in a database and/or used in finding other scenarios which are similar to the received scenario (e.g., based on the feature vectors of the other scenarios).

In an example, the scenario analysis system may receive the sensor data and generate the scenario representation as a set of frames. For example, the scenario representation may include five seconds of data having 10 frames per second. Each frame may include agent feature data including agent positions; agent headings; agents speed; and/or agent type or class.

The scenario analysis system may determine a boundary or boundaries for the received scenario. For example, the scenario analysis system may filter the agent feature data to determine all agents that intersect a large region around the subject vehicle over the five-second time interval (e.g., based on the position of the subject vehicle in individual frames).

The scenario analysis system may then determine discrete areas within the boundaries of the individual frames. For example, the scenario analysis system may determine discrete areas located within a range of the subject vehicle position in one or more of the frames. In some examples, the discrete areas may be hexagonal areas arranged in concentric rings around the subject vehicle. However, other shapes or patterns may be utilized in other examples (e.g., squares, triangles, or mixes of shapes). The area within the boundary or boundaries may be partitioned or tessellated into the discrete areas. In some examples, the discrete areas may have been previously defined relative to the geographic areas of, for example, a road network. In such examples, the previously defined discrete areas may include road feature data of the discrete area. While examples discussed herein utilize previously defined discrete areas positioned relative to the road network, examples are not so limited. For example, a scenario analysis system may generate the discrete areas based on the location of the subject vehicle in one or more frames and determine road network data for the generated discrete areas dynamically during runtime.

For individual frames, the scenario analysis system may determine a center discrete area. For example, the center discrete area may be the discrete area that is closest to the location of the subject vehicle (e.g., a center of the vehicle) or a discrete area that best matches the location of the subject vehicle (e.g., a discrete area that overlaps most with a bounding box of the subject vehicle). The scenario analysis system may then label one or more of the discrete areas for the individual frame based on the location of the subject vehicle and a heading of the subject vehicle in the individual frame. As used herein, labeling of discrete areas may refer to enumeration or indexing of the discrete areas by assigning labels or identifiers to the discrete areas. As mentioned above, the discrete areas may include a pattern of hexagonal discrete areas around the hexagonal discrete area closest to the location of the subject vehicle. For example, the hexagonal discrete areas may be arranged in concentric rings around the center discrete area. The scenario analysis system may label the discrete areas for an individual frame based on their position relative to the subject vehicle or the center discrete area and their position relative to the heading of the subject vehicle such that the hexagonal discrete area in a ring closest to the heading of the subject vehicle may receive the first label of the ring with other hexagonal discrete areas labeled in order around the circle from the first labeled discrete area. Such an example labeling is shown in FIGS. 3A-3D.

The scenario analysis system may then determine agent feature data for the discrete labeled areas of the individual frame. For example, the scenario analysis system may determine, for individual frames, the presence or absence of an agent in the discrete area, the heading and speed of the agent, the class or category of the agent, and so on.

The scenario analysis system may then aggregate the agent features and road features of the frames to generate a scenario feature vector. For example, the agent features and road features of a labeled discrete area in a frame may be aggregated with agent features and road features of discrete areas with the same label from other frames.

The resulting scenario feature vector may then be stored in a scenario database and/or used in finding other scenarios which are similar to the received scenario (e.g., based on the feature vectors of the other scenarios stored in the scenario database). In some examples, a similarity metric between the scenario feature vectors of two scenarios may be determined using a vector distance determination.

The techniques described herein can be implemented in a number of ways to generate feature vectors and/or utilize feature vectors in determining similar driving scenarios based on an input scenario representations of driving scenarios. Examples are provided below with reference to FIGS. 1-8. Examples are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles. Furthermore, the techniques described herein can be used with real data (e.g., captured using sensor(s)), simulated data (e.g., generated by a simulator), or any combination of the two.

FIG. 1 is an example block-diagram illustrating an example architecture of a scenario analysis system 100 configured to generate feature vectors usable in determining similar driving scenarios based on an input scenario representation of a driving scenario. As discussed above, scenario analysis may generate feature vectors for use with simulation, modeling, and testing autonomous vehicle systems and may assist with improving overall operations of the autonomous vehicles when encountering new or unexpected situations.

In the current example, log data 102 may be received from one or more vehicles 104 operating on various roadways in real-world or simulated conditions and environments. The log data 102 may include sensor data, perception data, prediction data, trajectory information, and the like. In addition or alternatively, the received log data 102 may be captured based on simulations of vehicle systems in virtual environments, or based on the actual operation of a vehicle 104 operating in the physical or simulated world. The received data may include any data relating to the vehicle (e.g., vehicle type, size, weight, position, pose, velocity, etc.) and/or to the environment surrounding the vehicle 104. Such data may include the driving conditions (e.g., weather, road conditions, sun position and time and day, etc.) and characteristics of any static or dynamic objects in the areas proximate to the vehicle in the environment. Additionally, the log data 102 may include vehicle and environment data captured over a period of time sufficient for the scenario to be observed, analyzed, and acted upon by the vehicle systems. In some instances, the log data 102 received from the vehicles 104 may include data representing the environment of a vehicle over a predetermined time window, such as 0.5 secs, 1 sec, 1.5 secs, 2 secs, 2.5 secs, 3 secs, and so on, during which the systems and features of an autonomous vehicle may detect, analyze, and react to the input data provided by the scenario.

The log data 102 may be processed by a data extraction component 106. The data extraction component 106 may be configured to parse log data received from one or more vehicles 104 based on a set time interval (e.g., every 40 milliseconds, every 80 milliseconds, every 100 milliseconds, etc.).

For each time interval, the data extraction component 106 may define a set of regions surrounding the vehicle 104. In some cases, the regions may be defined based on lane designations within the environment and relative to the position of the vehicle capturing the sensor data and generating the log data 102.

In some implementations, the data extraction component 106 may determine the existence of objects within each of the regions. For example, one or more objects may be present in each region. The data extraction component 106 may then determine or identify a classification or type associated with each object in each region. The data extraction component 106 may then select or determine a representative object of each classification or type within each region. Parameters associated with the representative objects and the vehicle 104 as well as features of the environment may be extracted from the log data 102 by the data extraction component 106. For example, the vehicle parameters may include, but are not limited to, current drive mode, current drive state, planned maneuver, total velocity, total acceleration, longitudinal acceleration, lateral acceleration, distance to an intersection, longitudinal acceleration, lateral acceleration, yaw, yaw rate, lane identifier, road identifier, Euclidian position, and the like.

The extracted data 108 (e.g., the regions, representative objects, parameters, features, etc.) may then be modeled such as by a statistical modeling technique or, in some cases, by using one or more stochastic model, by a log data filtering component 110. For example, the log data filtering component 110 may associate the extracted data 108 corresponding to each time interval represented by the log data 102 to one or more models in order to generate filtered data 112. In some cases, the filtered data 112 may be sparse data associated with events or arrangements of objects, parameters, and object states relative to the vehicle. In some cases, the log data filtering component 110 may perform filtering to remove or prevent non-relevant or impossible/improbable data (such as log data representing physically impossible parameters) from being incorporated into top-down scenario representations 116. For example, the log data filtering component 110 may filter data that represents measurements or distances outside of defined threshold or limitations (e.g., removing data representing a vehicle that is 15 meters long).

An object detection component 114 may receive the filtered data 112 and may generate top-down scenario representations 116 which may include vectorized data defining representative objects in the scenario. In some cases, the top-down scenario representation 116 may comprise parameters associated with the vehicle itself, and features of any agents within the scenario and/or the physical environment from which the log data 102 was generated. As introduced above, a top-down scenario representation 116 may include image(s) (and/or other types of encodings or representations) that represent the environment at time $T_{-N}$, and may include one or more bounding boxes representing a location and extent (e.g., length and width) of the agents at the indicated times. Further, the top-down scenario representation can include a bounding box representing the autonomous vehicle, and/or other objects in the scenario environment. As can be understood, each top-down scenario representation 116 may include any number of static objects (e.g., buildings, trees, curbs, sidewalks, map elements, etc.) or dynamic objects (e.g., agents) in the environment at any time, and is not limited to one agent/bounding box.

In some examples, top-down scenario representations 116 can further include velocity information associated with the autonomous vehicle and/or any dynamic objects in the environment, which may be represented as a velocity vector associated with the corresponding bounding box. The top-down scenario representations 116 also may include additional information representing objects in the environment or states of objects in the environment. For example, top-down scenario representations 116 can include lane information or corridor information indicating that a lane associated with a bounding box (e.g., associated with the autonomous vehicle) is controlled by a traffic light.

As can be understood, bounding boxes determined based on objects in an environment can be associated with different locations and/or movement information over time. Accordingly, the top-down scenario representations 116 can include velocity information associated with a bounding box that is the same or different as the corresponding velocity information at a different time. Further, the locations of a bounding box may be updated throughout the different scenario representations to illustrate a movement of an agent as the agent traverses the environment.

In some instances, the object detection component 114 may determine frequency of occurrence measurements for a top-down scenario representation 116 within a family or occupation hierarchy. For instance, occupations may be stored based on the arrangement of objects relative to the predefined regions and/or the vehicle. In examples, the occupations may form a hierarchy of occupations based on an occupancy of the regions or the position of the objects relative to the vehicle. In some cases, the broader or large tiers of the hierarchy may form the top tiers in a reverse pyramid structure. For instance, a first tier or level of the hierarchy may be defined as all occupations in which a first region is occupied by a first type of object regardless of the presence of other objects or the parameters or states associated with the objects. The hierarchy may also include a first sub-tier or level that includes the first region occupied by the first type of object and a second region occupied by a second type of object and a second sub-tier or level in which the first region is occupied by the first type of object and the first region is occupied by a second type of object. Thus, a frequency of occurrence related to occupations in which the region to the front of the vehicle is occupied by a motorized vehicle may be determined based on the number and arrangement of sub-occupations within the hierarchy.

A feature vector component 118 may receive the top-down scenario representations 116 of the scenarios and generate feature vectors 120 for the scenarios. In an example, the feature vector component 118 may receive the top-down scenario representations 116 as frames of the scenarios. For example, a scenario may include top-down scenario representations 116 representing five seconds of log data at a rate of ten (10) frames per second, though other times and rates may be used. As discussed below, in some examples, the feature vector component 118 may use agent feature data including agent positions; agent headings; agents speed; and/or agent type or class as well as information relating to road feature data from the top-down scenario representations 116 in generating the feature vectors.

Upon receiving the top-down scenario representations 116 as frames of the scenario, the feature vector component 118 may determine a boundary or boundaries for the received scenario. For example, the feature vector component 118 may filter the agent feature data to determine all agents that intersect a large region around the subject vehicle 104 over the five second time interval (e.g., based on the position of the subject vehicle 104 in individual frames). Depending on the example, the feature vector component 118 may determine an overall boundary for the scenario or may determine boundaries on a per-frame or group of frame basis.

The feature vector component 118 may then determine discrete areas within the boundaries of the individual frames. For example, the feature vector component 118 may determine discrete areas located within a range of the subject vehicle's position in one or more of the individual frames. In some examples, the discrete areas may be hexagonal areas arranged in rings around the vehicle 104. However, other shapes or patterns may be utilized in other examples.

In some examples, the discrete areas may have been previously defined with respect to geographic areas of, for example, a road network. In such examples, the previously defined discrete areas may include road feature data of the discrete areas. In such an example, the feature vector component 118 may utilize the road feature data of the discrete area in addition to or as an alternative of any road feature data of the top-down scenario representations.

The feature vector component 118 may then determine labelings of the discrete areas. For an individual frame, the feature vector component 118 may determine a center discrete area. For example, the center discrete area may be the discrete area that is closest to the location of the subject vehicle (e.g., a center of the vehicle) or a discrete area that best matches the location of the subject vehicle (e.g., a discrete area that overlaps most with a bounding box of the subject vehicle). The feature vector component 118 may then label one or more of the discrete areas for the individual frame based on the location of the subject vehicle and a heading of the subject vehicle in the individual frame. As mentioned above, the discrete areas may include one or more rings of hexagonal discrete areas around the center discrete area. The feature vector component 118 may label the discrete areas for an individual frame based on their position relative to the subject vehicle or center discrete area and their position relative to the heading of the subject vehicle.

The feature vector component 118 may then determine agent feature data for the labeled discrete areas of the individual frame. For example, the feature vector component 118 may determine the presence or absence of an agent in the discrete area, the heading and speed of the agent, the class or category of the agent, and so on. Some examples may include different fields in the feature vector for each class or category of agent (e.g., a pedestrian heading field and a vehicle heading field).

The feature vector component 118 may then aggregate the agent features and road features of the frames to generate a scenario feature vector. For example, the agent features and road features of a labeled discrete area in a frame may be aggregated with agent features and road features of labeled discrete areas that have the same label from other frames. In some examples, features values may be aggregated by determining a sum or mean value. For example, the feature values of a first discrete area in a first frame with a particular label may be added to the feature values of a second discrete area in a second frame with the same particular label. This may continue over the frames of the scenario. The resulting sums may then be divided by the number of frames.

The feature vector component 118 may then output the resulting scenario feature vector for storage in a scenario database or for use in finding other scenarios which are similar to the received scenario (e.g., based on the feature vectors of the other scenarios stored in the scenario database). More particularly, the feature vector component 118 may output the resulting scenario feature vectors as feature vectors 120.

The scenario storage component 122 of the scenario analysis system 100 may receive feature vectors 120 and store the vectors along with the scenario representation in a scenario representation and/or feature vector data store 124.

Figure 2:
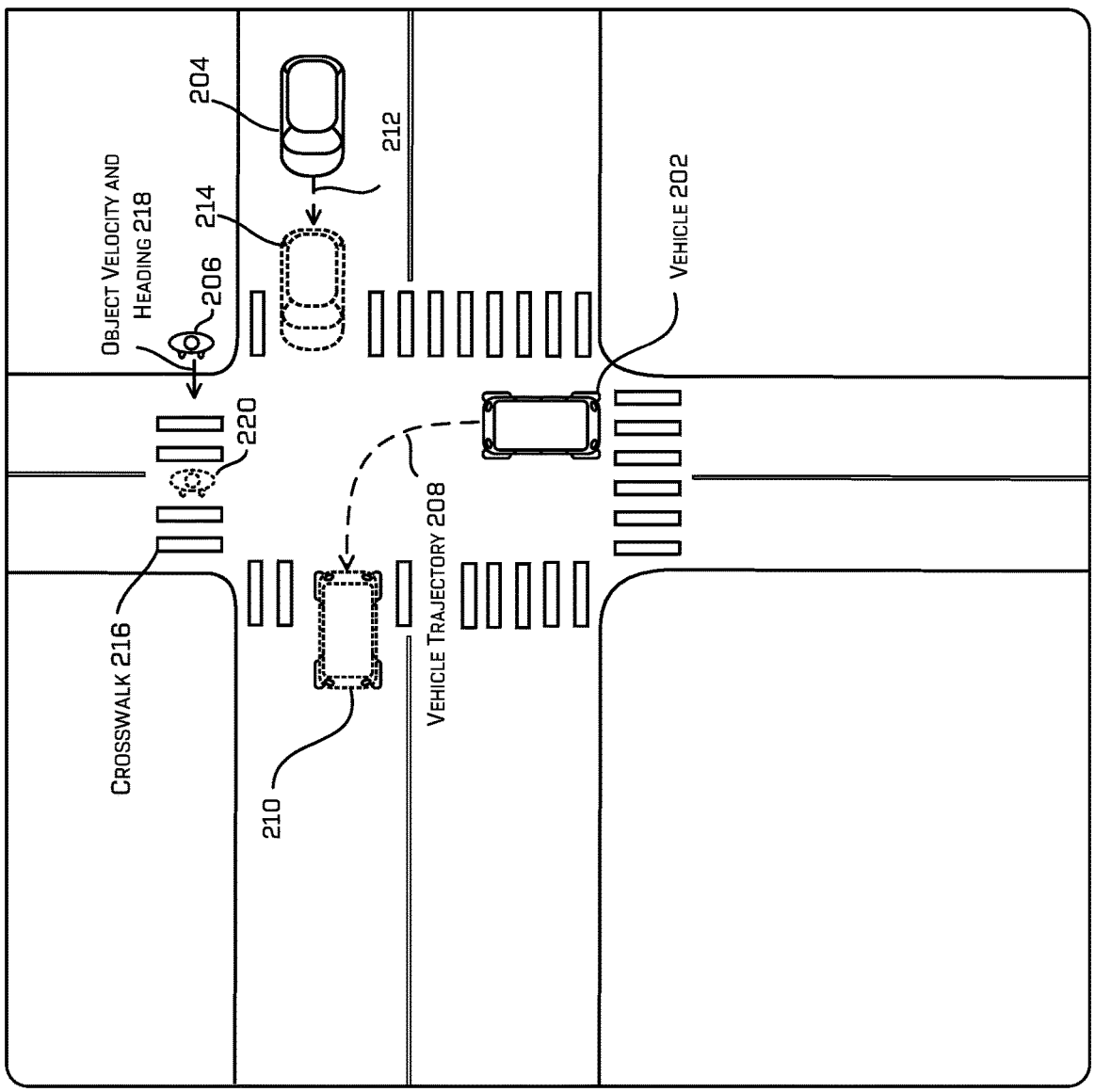
FIG. 2 is an example block-diagram illustrating an example architecture of a system for analyzing and storing scenarios, in accordance with implementations of the disclosure.
Figure 3A:
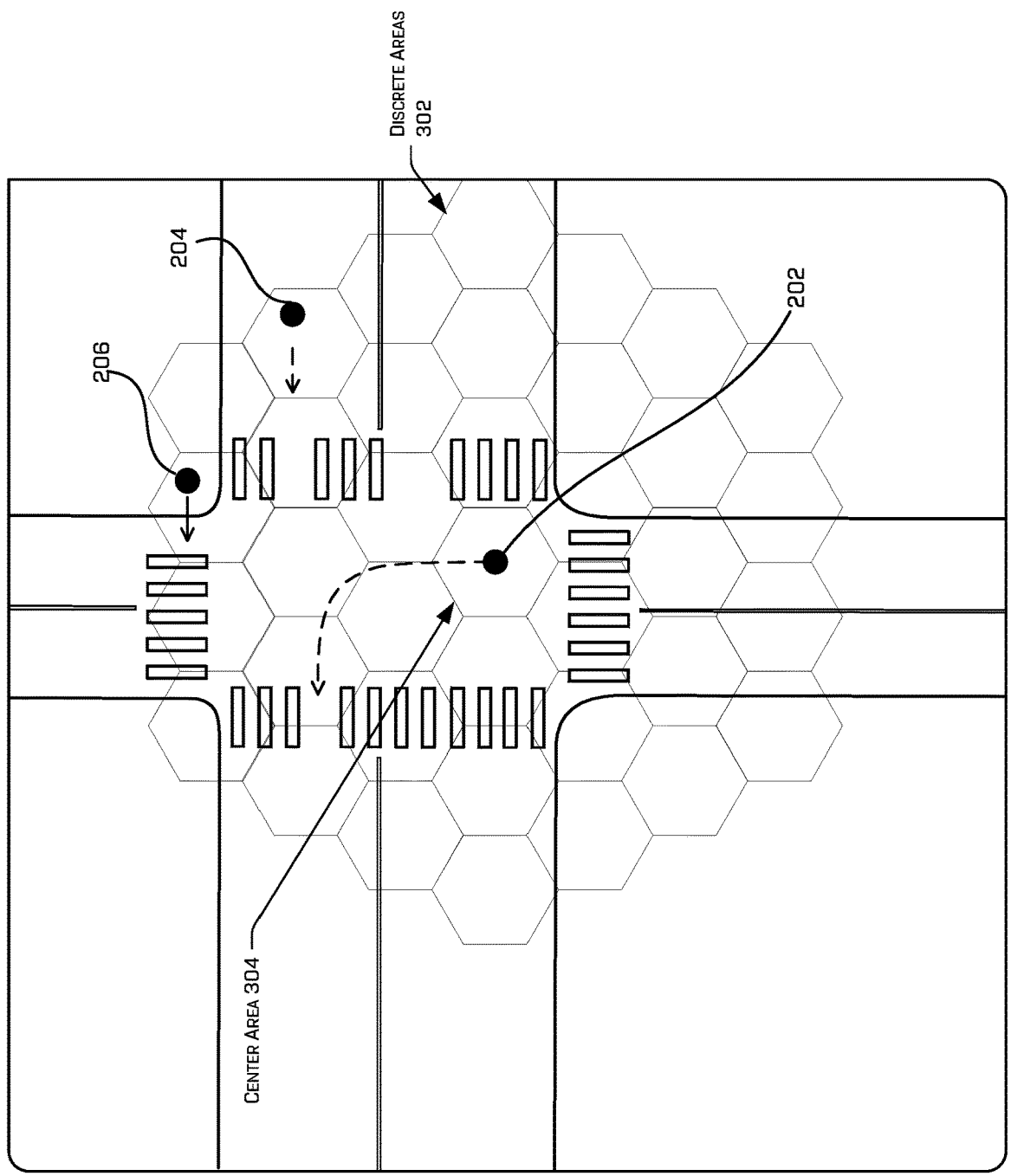
FIG. 3A illustrates an example diagram of the determination of discrete areas based on the vehicle location within individual frames of the driving scenario illustrated in FIG. 2, in accordance with implementations of the disclosure.
Figure 3B:
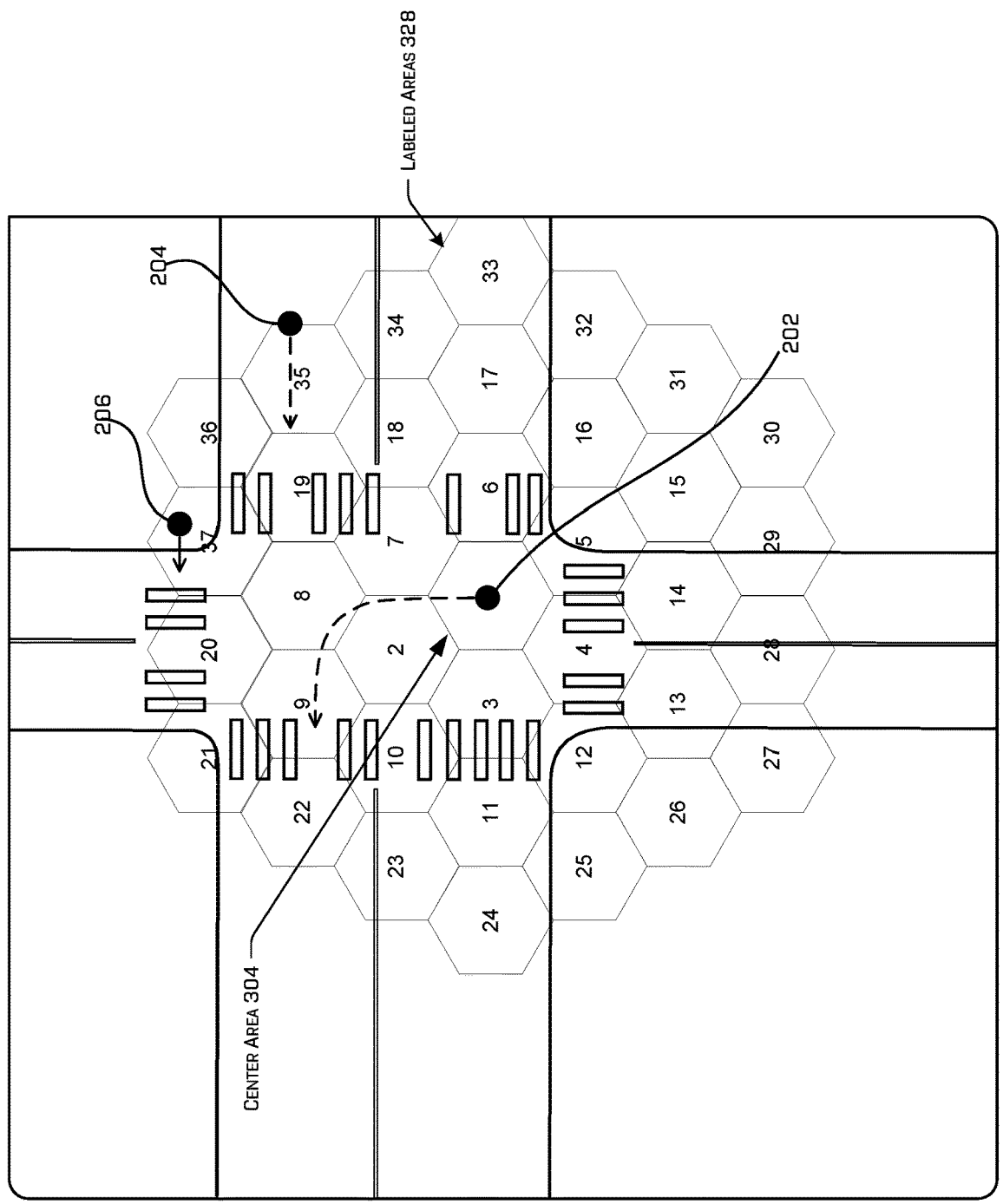
FIG. 3B illustrates an example diagram of the determination of labels and feature values for the discrete areas determined in FIG. 3A, in accordance with implementations of the disclosure.
Figure 3C:
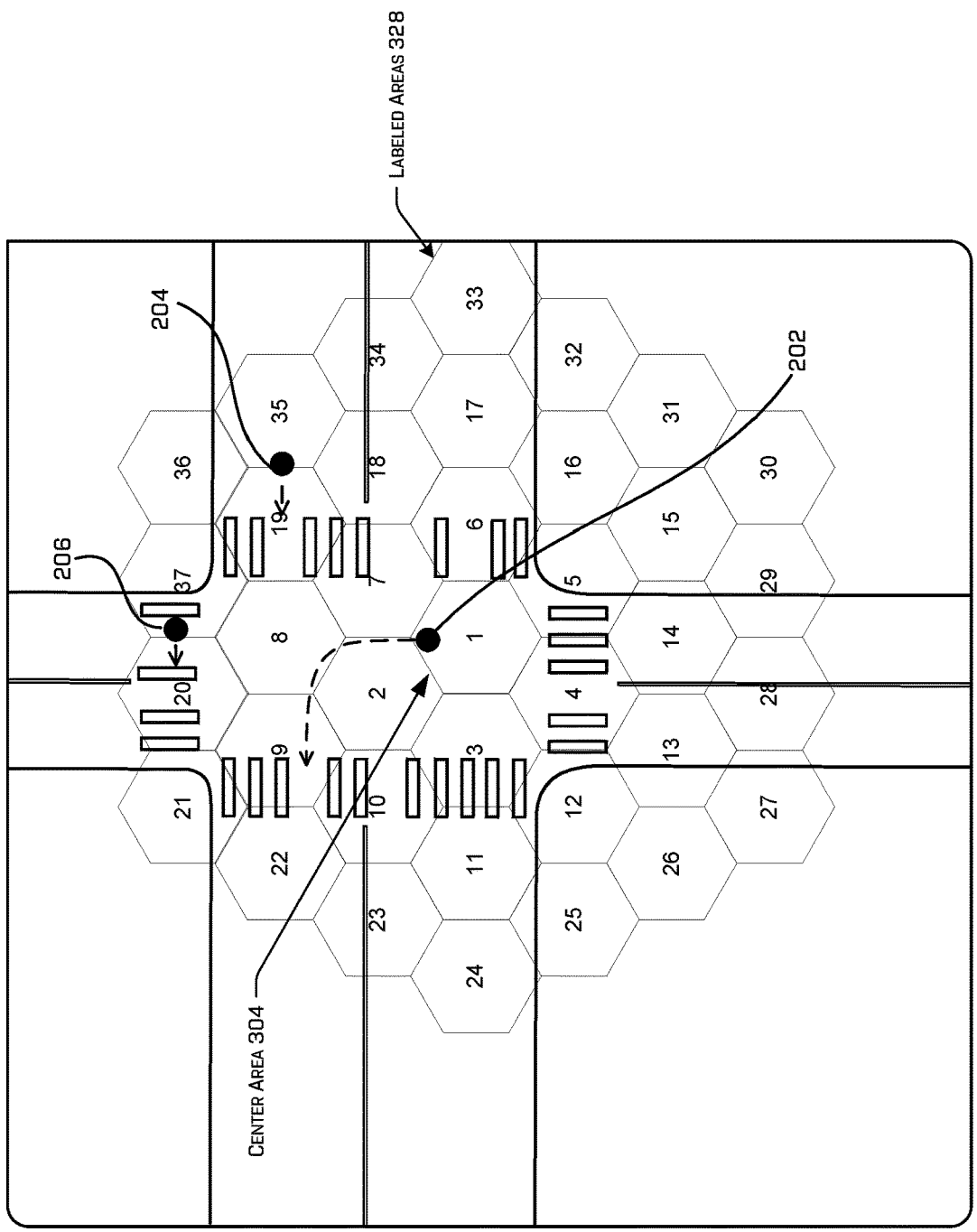
FIG. 3C illustrates an example diagram of the determination of labels and feature values for the discrete areas in a frame occurring after the frame represented in FIG. 3B, in accordance with implementations of the disclosure.
Figure 3D:
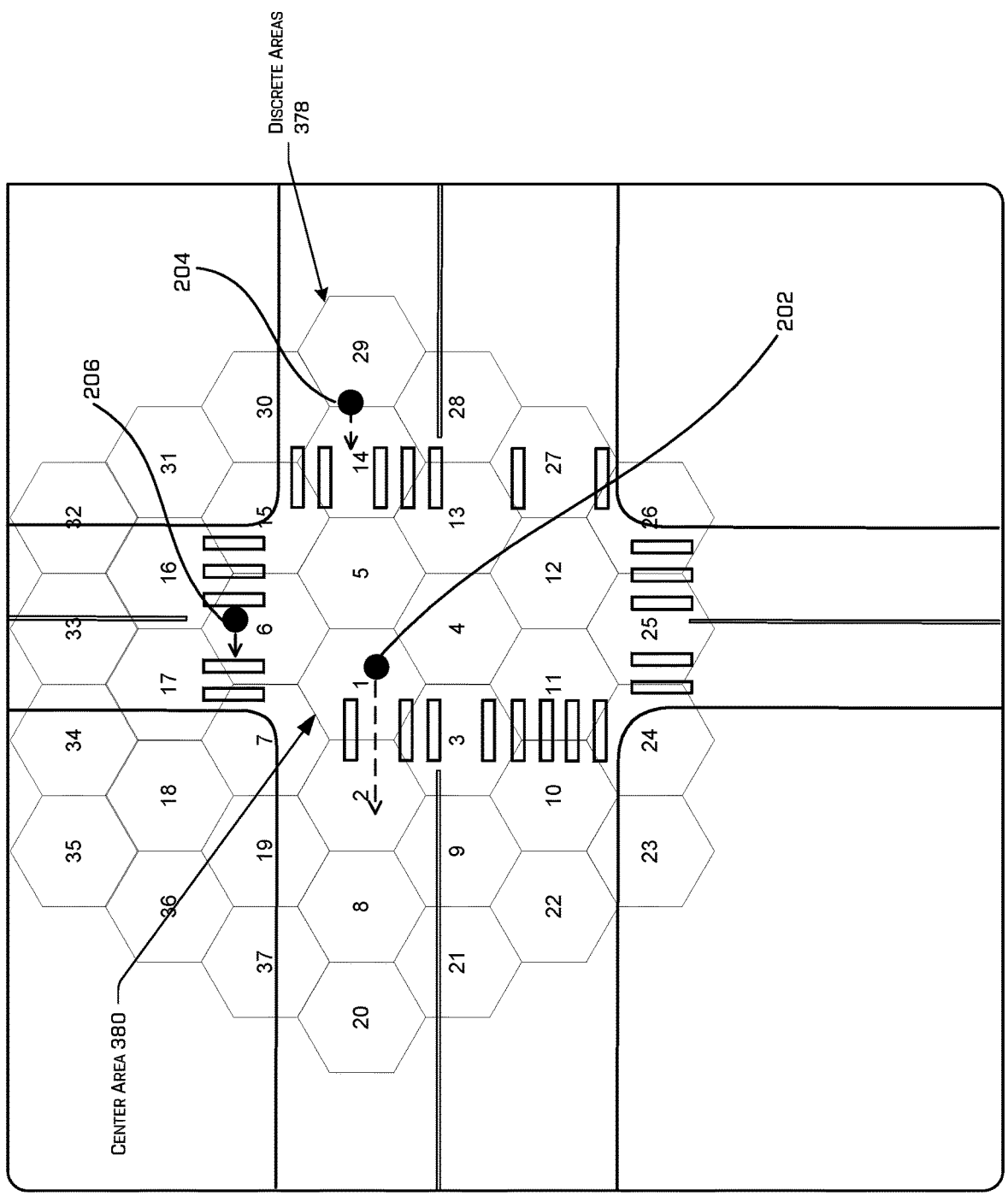
FIG. 3D illustrates an example diagram of the determination of labels and feature values for the discrete areas in a frame occurring after the frame represented in FIG. 3C, in accordance with implementations of the disclosure.

FIGS. 2-3D illustrate examples of generating a feature vector usable in determining similar driving scenarios based on an input scenario representation. In some examples, some or all of discussed operations or processes may performed by various components of a scenario analysis system 100.

FIG. 2 illustrates an example diagram 200 representing a driving scenario corresponding to a set of scenario representations or frames that may be utilized to generate a feature vector of the driving scenario. More particularly, the example diagram 200 may represent the change between a first frame and last frame of the driving scenario. The driving scenario may include a subject vehicle 202 and two objects 204 and 206, another car and a pedestrian, respectively.

As shown, the subject vehicle 202 may follow the vehicle trajectory 208 between the first and last frame to the position 210 of the vehicle at the end of the scenario. The object 204 may follow the object trajectory 212 between the first and last frame to the position 214 of the object 204 at the end of the scenario. Similarly, the object 206 may cross the crosswalk 216 by following the object trajectory 218 between the first and last frame to the position 220 of the object 206 at the end of the scenario. Frames of the driving scenario may be received by the feature vector component 118 ten times per second. As such, if the time between the first and last frame of the driving scenario is 5 seconds, the frames of the driving scenario may include roughly 50 frames.

The feature vector component 118 of the scenario analysis system 100 may take in the frames of the driving scenario represented by FIG. 2 and perform operations to process the frames to generate the feature vector as illustrated in FIGS. 3A-3D.

FIG. 3A illustrates an example diagram 300 of the determination of discrete areas based on the vehicle location within individual frames of the driving scenario illustrated in FIG. 2.

As mentioned above, the feature vector component 118 may process the frames of the driving scenario to determine boundaries (not shown) around the subject vehicle 202. In some examples, the boundaries of the scenario may be determined based on the positions of all agents that intersect an area around the subject vehicle 202 during the driving scenario. In such an example, once the agents that intersect the area around the subject vehicle during the driving scenario are determined, a boundary may be determined that encompasses the positions of the agents over the course of the driving scenario. Examples may determine the boundaries of the scenario in a variety of ways, such as on a frame-by-frame basis or on an aggregate basis. For example, examples may determine the boundaries for a frame to encompass the positions of the agents during that frame. Alternatively or additionally, examples may determine the boundaries for all the frames to encompass the positions of the agents during all the frames.

The feature vector component 118 may determine the discrete areas 302 of the first frame based on the location of the vehicle 202 in the first frame of the driving scenario. In the example illustrated in FIGS. 3A-3D, the feature vector component 118 utilizes previously defined discrete areas 302 to determine the discrete areas 302 for the frame. More particularly, the feature vector component 118 may operate to determine a previously defined discrete area that is closest to the vehicle 104 as a center area 304. The feature vector component 118 may then determine one or more additional discrete areas surrounding the center area 304. In the illustrated example, the feature vector component 118 may determine the discrete areas 302 as a pattern of hexagons surrounding the center area 304. The size and shape of the discrete areas may vary from example to example. Further, the size and shape of the discrete areas may vary, for example, within a frame. For example, the discrete areas within a certain distance of the vehicle 202 may be smaller than discrete areas outside of that distance from the vehicle 202. These and other variations would be apparent to one of ordinary skill in the art in view of this disclosure.

FIG. 3B illustrates an example diagram 326 of the determination of labels and feature values for the discrete areas 302 determined in FIG. 3A.

In some examples, the labels for the labeled discrete areas 328 may be determined based on the location and heading of the vehicle 202. In the illustrated example, the labeled discrete areas 328 may be enumerated in a fixed order. More particularly, the fixed order in which the labeled discrete areas 328 may be labeled may be in accordance with the following rules:

1. A hexagon h is identified with a pair (r, p), where r is a nonnegative integer that denotes the (hexagonal) grid distance between h and the center area 304, and p is a real number between $\pm\pi$ denoting the angle difference between vehicle's current heading and the heading of h (e.g., the angle formed by the center of h and the center area 304); and
2. Hexagons $h_1=(r_1, p_1)$ and $h_2=(r_2, p_2)$ are ordered as $h_1 < h_2$ if and only if:
   a. $r_1 < r_2$, or
   b. $r_1 = r_2$ and $p_1 < p_2$ As shown, the discrete areas 2, 8 and 20 have centers that are closest to being in line with the current yaw of the vehicle 202 (illustrated as slightly over $\frac{1}{2}\pi$). As such, the numbering for the first ring around the center area 304 begins at 2 and continues counterclockwise until the ring is filled, using labels 2 to label 7. The numbering for the second ring then begins at 8 and continues counterclockwise until the ring is filled, using labels 8 to label 19. A similar process may then be performed for the third ring and any additional rings. As the labels of the labeled discrete areas 328 may be determined on a per-frame basis based on the location and heading of the vehicle 202 in the frame, discrete areas may be labeled differently in different frames. This may be seen with a comparison of FIG. 3B and FIG. 3D in which the vehicle 202 has changed both position and direction such that labels of the discrete areas changes. Additional discussion of the change in labeling is provided below with regard to FIG. 3D. While the example discussed herein includes labeling the discrete areas using the above rules, other examples may utilize different rules based on the heading and position of the vehicle 202. For example, the labeling over each ring of hexagons may begin with the discrete area closest to being in line with a direction with an angle difference from the vehicle's current heading of $\pi$. Other variations would be apparent to one of ordinary skill in the art based on this disclosure.

Once the discrete areas 328 have been determined and labeled, the feature vector component 118 may determine agent features for agents present in each discrete area 328. As discussed above, the agent features may include an agent presence feature, an agent speed feature, an agent heading feature, an agent class feature and/or any other information about the agents. For example, the feature vector component 118 may determine that the agent presence feature for the labeled discrete areas 328 labeled as 35 and 37 to be "1" or "true" for the frame represented in FIG. 3B due to the presence of objects 204 and 206, respectively. The feature vector component 118 may repeat this determination for each agent feature of the feature vectors. While the illustrated examples herein show the determination of the presence or absence of an agent in a discrete area to be based on a center portion of the agent, this is merely for ease of illustration and examples are not so limited. In some examples, the determination of the presence or absence of the agent may rely on a bounding box of the agent. Further, some examples may establish a buffer around the bounding boxes of agents. In some examples, the feature vectors component 118 may buffer the bounding boxes by the average radius of the discrete areas or by another measure. Further, the example discussed with respect to FIGS. 3A-3D may include different fields for features of different agent types. For example, the presence, heading, speed and class features of vehicle agents may have different fields from the presence, heading, speed and class features of pedestrian agents.

After determining the agent features for the individual frame, the feature vector component 118 may perform similar operations for road network features of the feature vector. For example, for a drivable surface feature, the feature vector component 118 may determine the drivable surface feature of discrete areas 15, 26, 30, and 31 to be zero (0) and the drivable surface feature of the other discrete areas to be one (1). Similarly, the feature vector component 118 may determine a crosswalk feature for discrete areas 3-7, 9-14, 18-19, 20-22, and 37 to be one (1) and the crosswalk feature of the other discrete areas to be zero (0). The feature vector component 118 may repeat this determination for each road network feature of the feature vectors.

The feature vector component 118 may then aggregate the agent features and road features of the labeled discrete areas 328 for the current frame into a feature vector for the scenario. For example, the agent features and road features of the labeled discrete areas 328 for the current frame may be aggregated with agent features and road features of discrete areas of other frames which have the same label. As mentioned above, because the labels of the discrete areas may be determined on a per-frame basis based on the location and heading of the vehicle 202, aggregation by a label may result in feature values of a discrete area in a current frame being aggregated with the feature values from another frame that correspond to a different discrete area which has the same label in the other frame.

FIG. 3C illustrates an example diagram 350 of the determination of labels and feature values for the discrete areas 302 in a frame occurring after the frame represented in FIG. 3B.

As illustrated, the vehicle 202 remains in center area 304 but has moved further along its trajectory. In the frame represented in FIG. 3C, the trajectory of the vehicle 202 has not yet changed sufficiently to result in different labels being assigned to the discrete areas 328. The object 204 has moved to be present in both discrete areas 35 and 19 while object 206 has moved to be present in both discrete areas 37 and 20.

The feature vector component 118 may determine the agent features and road network features of the frame represented in FIG. 3C in a similar manner to that discussed above with regard to FIG. 3B. Further, the feature vector component 118 may aggregate the agent features and road features of the labeled discrete areas 328 for the frame represented in FIG. 3C into the feature vector for the scenario according to the labels of the discrete areas 328.

FIG. 3D illustrates an example diagram 376 of the determination of labels and feature values for the discrete areas 378 in a frame occurring after the frame represented in FIG. 3C.

As illustrated, the vehicle 202 has moved further along its trajectory and has moved into the discrete area previously labeled as discrete area 9 in FIGS. 3B and 3C. As such, the discrete area previously labeled as discrete area 9 may now be determined as center area 380 and labeled as 1. Further, the location and heading of the vehicle 202 has changed such that the labeling of each ring begins at the discrete area 378 closest to the new heading (shown as discrete areas 2, 8 and 20 in FIG. 3D.) As such, in the frame represented in FIG. 3D, while the object 204 has not moved significantly from its position in FIG. 3C, the object 204 is now present in discrete areas 14 and 29. More particularly, the discrete areas 328 labeled 19 and 35 in FIG. 3C have been relabeled as discrete areas 14 and 29 in FIG. 3D. Similarly, the object 206 is now present in discrete area 6 (which was previously labeled as discrete area 20 in FIG. 3C).

The feature vector component 118 may determine the agent features and road network features of the frame represented in FIG. 3D in a similar manner to that discussed above with regard to FIG. 3B and FIG. 3C. Further, the feature vector component 118 may aggregate the agent features and road features of the labeled discrete areas 378 for the frame represented in FIG. 3D into the feature vector for the scenario according to the labels of the discrete areas 378. For example, the aggregation may result in values of the discrete areas labeled 14 and 29 of the discrete areas 378 being aggregated with values of the discrete areas labeled 14 and 29 of the discrete areas 328 in FIGS. 3B and 3C (e.g., rather with than with their own values when discrete areas 14 and 29 were labeled discrete areas 19 and 35 in the previous frames shown in FIGS. 3B and 3C).

While three frames are illustrated in FIGS. 3A-3D, the determination of discrete areas, labeling of the discrete areas, determination of feature values of the discrete areas and the aggregation based on labeling may continue for each frame of the scenario.

FIG. 4A illustrates an example diagram of a heatmap 400 for the vehicle agent presence feature of the feature vector determined for the scenario represented by FIGS. 3A-3D.

As illustrated, the object 204 was present for one frame for each of the discrete areas labeled 14, 19 and 29 (represented by diagonal hatching). Similarly, the object 204 was present for two frames in the discrete areas labeled 36 (represented by cross-hatching).

FIG. 4B illustrates an example diagram of a heatmap 450 for the pedestrian agent presence feature of the feature vector determined for the scenario represented by FIGS. 3A-3D.

As illustrated, the object 206 was present for one frame for each of the discrete areas labeled 6 and 21 and 29 (represented by diagonal hatching). Similarly, the object 206 was present for two frames in the discrete areas labeled 20 (represented by cross-hatching).

The feature vector for the scenario may include a set of entries for the vehicle agent presence feature and for the pedestrian agent presence feature that may include values corresponding to those shown in the heatmaps 400 and 450.

Figure 5:
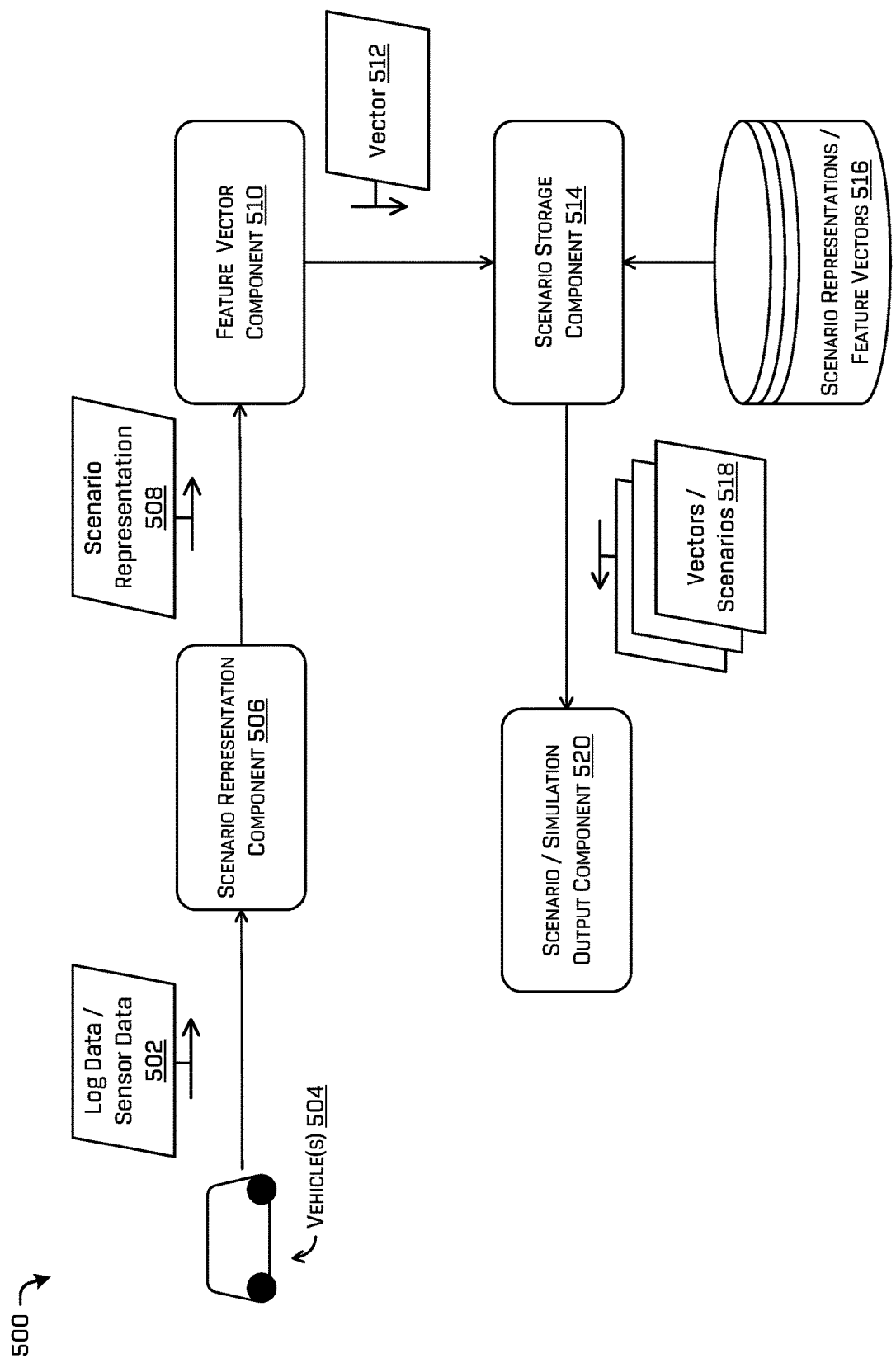
FIG. 5 is an example block-diagram 500 illustrating another example architecture of a scenario analysis system configured to analyze and retrieve similar scenarios based on an input scenario, in accordance with implementations of the disclosure.

FIG. 5 is an example block-diagram 500 illustrating another example architecture of a scenario analysis system configured to analyze and retrieve similar scenarios based on an input scenario. In some implementations, the scenario analysis system 500 may be similar or identical to the scenario analysis system 100 described above, although different components are depicted in this example to illustrate the different scenario analysis operations performed. For instance, while the scenario analysis system 100 of FIG. 1 includes components configured to receive, analyze, and store scenario representations in a data store 124, the scenario analysis system 500 includes additional components configured to receive and analyze an input scenario and then retrieve additional scenario(s) from the data store 516 that are similar to the input scenario.

In this example, sensor data and/or log data 502 may be received from a vehicle 504 operating within a real-world or simulated environment. As discussed above the log data 502 may include sensor data, perception data, prediction data, trajectory information, and the like. The scenario representation component 506 in this example may be configured to perform the various scenario analysis operations of the data extraction component 106, log data filtering component 110, and/or object detection component 114, described above.

The scenario representation component 506 may perform these functions described above, and may output a scenario representation 508 (e.g., a top-down representation) based on the received sensor data and/or log data 502. As discussed above, the top-down scenario representation 508 may include bounding boxes and associated attributes (e.g., positions, extents, velocities, poses, trajectories, etc.) for the vehicle, other agents, and other static or dynamic objects in the environment associated with a scenario, and different scenario representation data may be determined for different time intervals.

The feature vector component 510 may perform similar or identical operations to those described above for the feature vector component 118. For instance, the feature vector component 510 may receive top-down scenario representations 508 as input data for a scenario and may extract a feature vector 512 for the scenario. The vector 512 may be a data set or data object representative of the scenario corresponding to the sensor data and/or log data 502 as discussed above with respect to FIGS. 1-4B. As noted above, the feature vector 512 may be used to retrieve similar driving scenarios that were previously generated and/or stored in the data store 516.

The scenario storage component 514 may be configured to access the scenario representations and feature vectors in the data store 516 to retrieve one or more vectors 518 based on the vector 512 associated with the input scenario. In some examples, the scenario storage component 514 may use vector distances or other comparisons, using the vector 512 as input, to select additional scenarios and/or feature vectors 518 within the data store 516.

In some examples, the features of the feature vectors may not be measured in the same units (e.g., track velocity may be in m/s, while track heading may be in radians). Various metrics may be used to provide a measure of similarity. In an example, the feature vectors may include, for each feature (e.g., agent features and road network features), a feature array with a length equal to the number of discrete areas. For each feature array of the feature vector 512 and a corresponding feature array of the stored feature vector being compared to the feature vector 512, a difference may be determined as:

$$d(v_1, v_2) = \frac{\|v_1 - v_2\|^2}{\|v_1\|^2 + \|v_2\|^2}$$

where $v_1$ is the feature array of the feature vector 512 and $v_2$ is the corresponding feature array of the stored feature vector being compared to the feature vector 512.

Another example metric may determine the difference as:

$$d_{norm}(v_1, v_2) = \frac{Var(v_1 - v_2)}{Var(v_1) + Var(v_2)}$$

where $v_1$ is the feature array of the feature vector 512 and $v_2$ is the corresponding feature array of the stored feature vector being compared to the feature vector 512.

The feature vector component 118 may utilize the resulting set of differences (e.g., corresponding to the features) to determine a similarity metric. For example, the feature vector component 118 may determine a mean error or a mean square error using the set of differences as errors.

The additional scenarios/vectors 518 selected by the scenario storage component 514 may represent the closest vectors within the data store 516, and each additional vector may be associated with a different scenario previously stored in the data store 516. In some cases, the scenario storage component 514 may select and retrieve a predetermined number (N) of vectors from the data store 516, based on distance calculations between the selected vectors and the vector 512 corresponding to the input scenario. Additionally or alternatively, the scenario storage component 514 may retrieve all vectors from the data store 516 that are within a predetermined similarity threshold to the vector 512.

Further, in some examples, the determination of similar feature vectors may be a multi-stage determination. For example, the determination of similar feature vectors may first be performed using a subset of the features of the feature vectors to determine a set of candidate feature vectors. In an example, the first stage may utilize a subset of features including a number of agents feature. Then, a determination of similar feature vectors may be performed for the set of candidate feature vectors using all of the features (e.g., agent features and road features).

In another example variation, the determination of similar feature vectors may include a weighting of the discrete areas. An example weight function may be a binary function. For example, the weight for a discrete area may be one (1) if the discrete area falls into a small expanded region around vehicle 504 and be zero (0) otherwise. In an example, the region may include a few rings around the center discrete area along with a cone of discrete areas in front of vehicle 504. More particularly, the region may include two (2) rings around the center discrete area and discrete areas in a 60-degree cone in front of the vehicle 504. In another example, the region may include two (2) rings around the center discrete area and discrete areas in a 180-degree cone in front of the vehicle 504.

In another example variation, the determination of similar feature vectors may include differences in the vehicle's speed across the scenarios as part of the generation of feature vectors and the similarity determination. For example, the determination of the vehicle speed feature may include a first feature/heatmap layer, where the value in each discrete area may be a binary value, and a second additional feature/heatmap layer, where the value in each discrete area may use the speeds of the agent(s) occupying the discrete areas. The resulting second feature/heatmap layer may then be weighted by agent velocity. The inclusion of both features/heatmap layers may allow for static agents to be handled, as the velocity-weighted heatmap may not distinguish between an empty discrete area and the presence of a stationary agent.

Other variations would be understood by one of ordinary skill in the art in view of this disclosure.

Additionally, the scenario analysis system 500 includes a scenario/simulation output component 520 configured to output scenarios based on the scenarios/vectors 518 selected by the scenario storage component 514. In some cases, the scenario/simulation output component 520 may use a lookup table to retrieve a scenario associated with each of the vectors retrieved from the scenario representations data store 516. These scenarios may represent the scenarios most similar to the sensor data and/or log data 502 of the input scenario.

Figure 6:
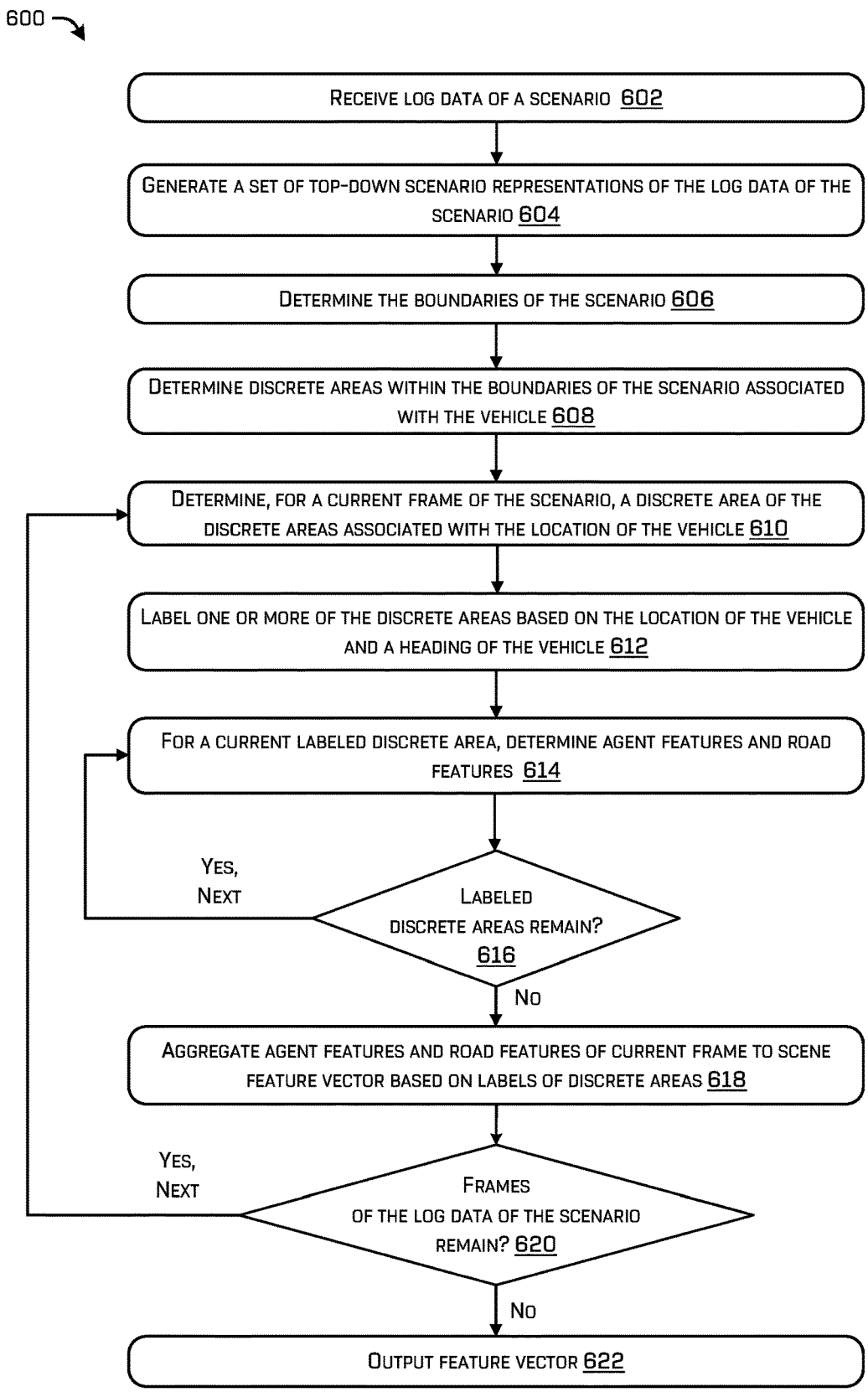
FIG. 6 is a flow diagram illustrating an example process of determining, based on an input scenario, a feature vector that may be usable in identification of similar scenarios, in accordance with implementations of the disclosure.

FIG. 6 is a flow diagram illustrating an example process 600 associated with the scenario analysis systems and techniques discussed above. In particular, process 600 describes determining, based on the input scenario, a feature vector that may be used to identify similar scenarios. As discussed above, scenario analysis and the identification of similar scenarios for use with simulation, modeling, and testing autonomous vehicle systems and software may improve overall operations of the autonomous vehicles when encountering new or unexpected situations.

Process 600 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 602, a scenario analysis system 100 may receive log data and/or sensor data associated with a driving scenario. In some instances, a scenario representation component may receive scenario input data including log data based on previous real-world driving operations and/or simulations, or sensor data based on the current real-world driving operations of a vehicle within an environment. The log data and/or sensor data may include data from any vehicle sensors, as well as perception data, prediction data, trajectory information, and the like.

At operation 604, the scenario analysis system 100 may analyze and process the log data, and generate a set of top-down scenario representations (also referred to herein as frames) at a number of time intervals in a format compatible with the feature vector component 118. For instance, a scenario representation component may perform data extraction operations, filtering operations, and/or object detection operations, as described above. The scenario representation component also may output a top-down scenario representation including environment data associated with a scenario.

At operation 606, the scenario analysis system 100 may process the frames of the driving scenario to determine boundaries around the subject vehicle. In some examples, the boundaries of the scenario may be determined based on the positions of all agents that intersect an area around the subject vehicle during the driving scenario. In such an example, once the agents that intersect the area around the subject vehicle during the driving scenario are determined, a boundary may be determined that encompasses the positions of the agents over the course of the driving scenario.

Examples may determine the boundaries of the scenario in a variety of ways, such as on a frame-by-frame basis or on an aggregate basis. For example, examples may determine the boundaries for a frame to encompass the positions of the agents during that frame. Alternatively or additionally, examples may determine the boundaries for all the frames to encompass the positions of the agents during that all the frames.

At operation 608, the scenario analysis system 100 may determine the discrete areas of the first frame based on the location of the subject vehicle in the first frame of the driving scenario. In the example illustrated in FIGS. 3A-3D, the feature vector component 118 utilized previously defined discrete areas 302 to determine the discrete areas 302 for the frame. More particularly, the feature vector component 118 may operate to determine a previously defined discrete area that is closest to the vehicle as a center area.

At operation 610, the scenario analysis system 100 may determine, for a current frame of the scenario, a discrete area of the discrete areas associated with the location of the vehicle. More particularly, the scenario analysis system 100 may determine the discrete area that is closest to or overlaps most with the subject vehicle of the scenario.

At operation 612, the scenario analysis system 100 may label one or more of the discrete areas based on the location of the vehicle and a heading of the vehicle. Such labeling may be performed as described above with respect to FIGS. 3B and 3D.

At operation 614, for a current labeled discrete area, the scenario analysis system 100 may determine agent features and road features. The determination of the agent features and road features may be performed as described above with respect to FIGS. 1-3D.

At operation 616, the scenario analysis system 100 may determine whether a labeled discrete area remains for the current frame. If so, the operations may return to 614 for the next labeled discrete area. Otherwise, the process may continue to 618.

At operation 618, the scenario analysis system 100 may aggregate the agent features and road features for the current frame into a feature vector of the scenario based on the labels of the discrete areas of the current frame. The aggregation of agent features and road features may be performed as described above with respect to FIGS. 1-4B.

At operation 620, the scenario analysis system 100 may determine whether frames of the log data of the scenario remain to be processed. If so, the operations may return to 610 for the next frame. Otherwise, the process may continue to 622. While the example illustrated in FIG. 6 operates to aggregate the features into the feature vector in a serial, frame-by-frame manner at 618, other examples may aggregate the agent features and road features for the frames of the scenario after operation 620.

At operation 622, the scenario analysis system 100 may output the feature vector for the scenario. As mentioned above, the feature vector may be stored for later use or used to determine similar scenarios to the scenario associated with the log data received at 602.

Figure 7:
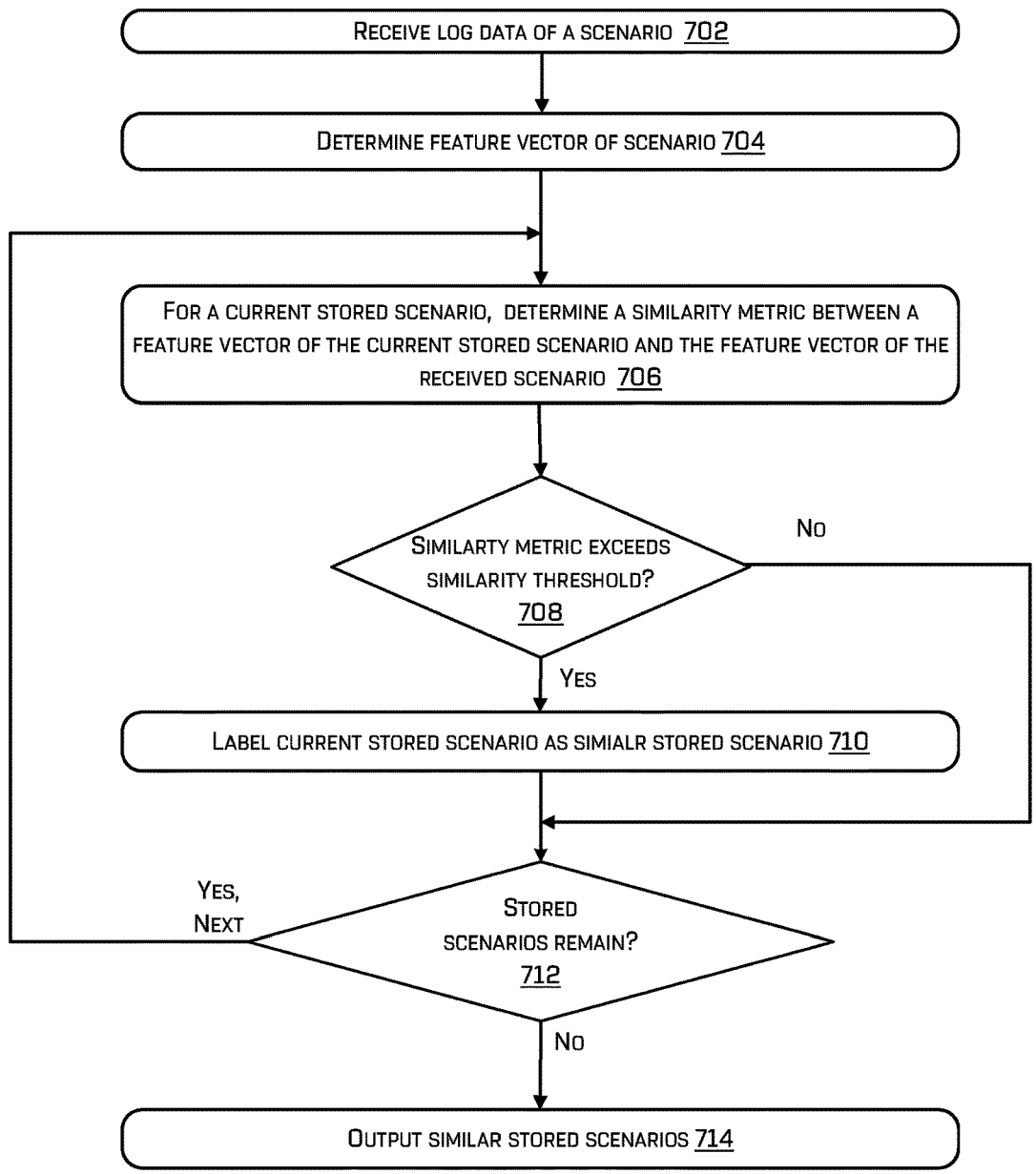
FIG. 7 is a flow diagram illustrating an example process of determining a similar driving scenarios associated with an input scenario based on feature vectors, in accordance with implementations of the disclosure.

FIG. 7 is a flow diagram illustrating an example process 700 associated with the scenario analysis systems and techniques discussed above. In particular, process 700 describes determining a similar driving scenarios associated with an input scenario based on feature vectors. As discussed above, scenario analysis and the identification of similar scenarios for use with simulation, modeling, and testing autonomous vehicle systems and software may assist with improving overall operations of the autonomous vehicles when encountering new or unexpected situations.

At operation 702, a scenario analysis system 100 may receive log data and/or sensor data associated with a driving scenario. This operation may be performed in a similar manner to 602 and as discussed above with regard to FIGS. 1-5 above.

At operation 704, a scenario analysis system 100 may determine a feature vector for the received scenario based on the received log data and/or sensor data. This operation may be performed in a similar manner to operations 604-622 and as discussed above with regard to FIGS. 1-5 above.

At operation 706, the scenario analysis system 100 may compare the feature vector determined in operation 704 to a current stored feature vector within a data store storing scenario representations and feature vectors associated with driving scenarios. More particularly, the scenario analysis system 100 may determine a similarity metric between the feature vector of the current stored scenario and the feature vector of the received scenario. This operation may be performed in a similar manner to that discussed above with regard to FIG. 1-5.

At operation 708, the scenario analysis system 100 may determine whether the similarity metric exceeds a similarity threshold. If so, the operations may continue to operation 710. Otherwise, the process may continue to operation 712.

At operation 710, the scenario analysis system 100 may label the current stored scenario as a similar stored scenario based on the similarity metric.

At operation 712, the scenario analysis system 100 may determine whether stored scenarios remain to be processed. If so, the operations may return to 706 for the next scenario. Otherwise, the process may continue to 714.

At operation 714, the scenario analysis system 100 may output the scenarios that were labeled as similar scenarios.

Figure 8:
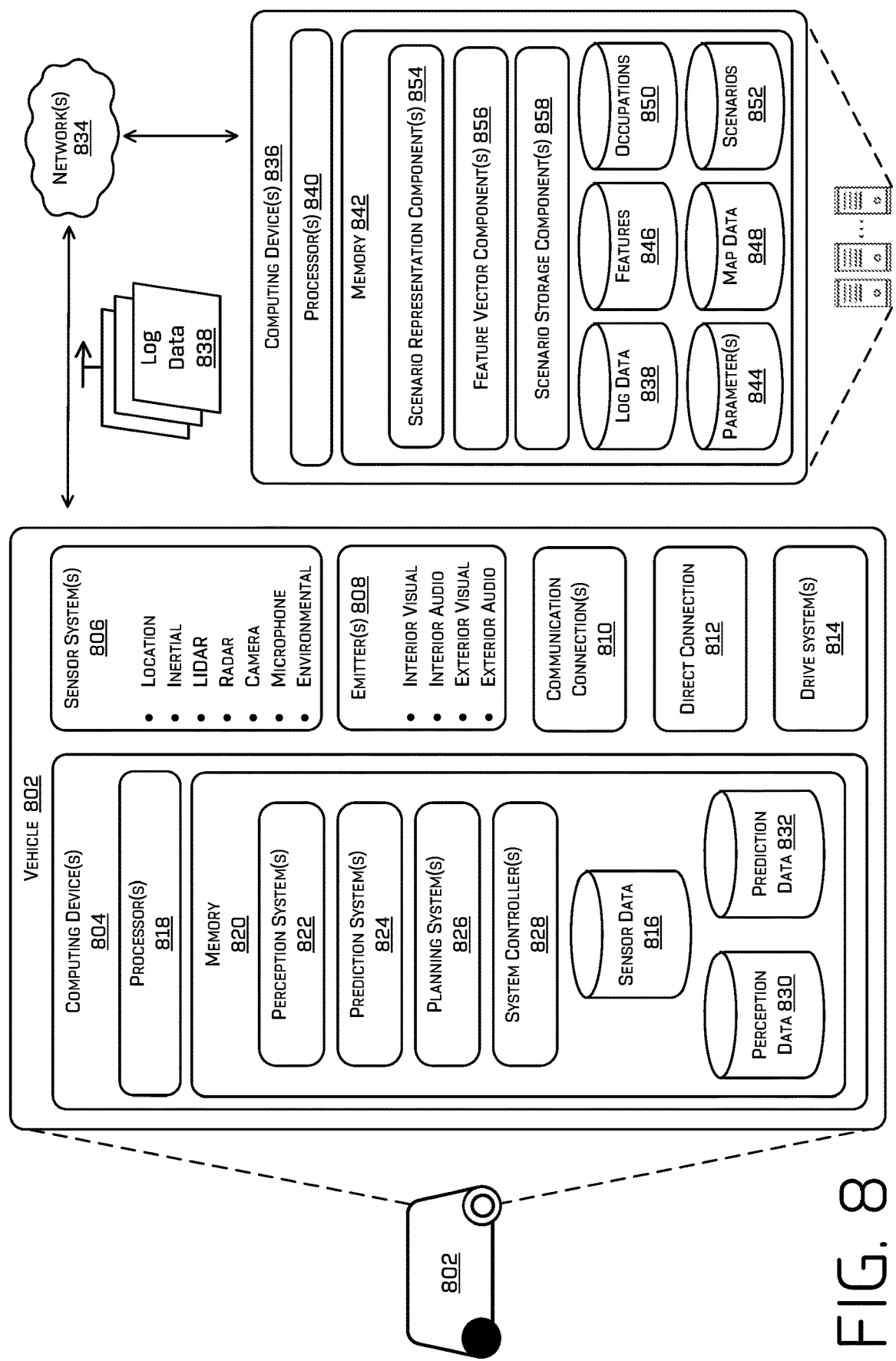
FIG. 8 depicts a block diagram of an example system for implementing the techniques discussed herein.

FIG. 8 depicts a block diagram of an example system 800 for implementing the techniques discussed herein. In at least one example, the system 800 may include a vehicle 802, such any autonomous vehicle (e.g., fully or semi-autonomous vehicle) discussed above. The vehicle 802 may include computing device(s) 804, one or more sensor system (s) 806, one or more emitter(s) 808, one or more communication connection(s) 810 (also referred to as communication devices and/or modems), at least one direct connection 812 (e.g., for physically coupling with the vehicle 802 to exchange data and/or to provide power), and one or more drive system(s) 814. The one or more sensor system(s) 806 may be configured to capture the sensor data 816 associated with a surrounding physical environment.

In at least some examples, the sensor system(s) 806 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 806 may include multiple instances of each type of sensors. For instance, time-of-flight sensors may include individual time-of-flight sensors located at the corners, front, back, sides, and/or top of the vehicle 802. As another example, camera sensors may include multiple cameras disposed at various locations about the exterior and/or interior of the vehicle 802. In some cases, the sensor system(s) 806 may provide input to the computing device(s) 804.

The vehicle 802 may also include one or more emitter(s) 808 for emitting light and/or sound. The one or more emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 802 can also include one or more communication connection(s) 810 that enable communication between the vehicle 802 and one or more other local or remote computing device(s) (e.g., a remote teleoperations computing device) or remote services. For instance, the communication connection(s) 810 can facilitate communication with other local computing device(s) on the vehicle 802 and/or the drive system(s) 814. Also, the communication connection(s) 810 may allow the vehicle 802 to communicate with other nearby computing device(s) (e.g., other nearby vehicles, traffic signals, etc.).

The communications connection(s) 810 may include physical and/or logical interfaces for connecting the computing device(s) 804 to another computing device or one or more external network(s) 834 (e.g., the Internet). For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 810 may comprise the one or more modems as described in detail above.

In at least one example, the vehicle 802 may include one or more drive system(s) 814. In some examples, the vehicle 802 may have a single drive system 814. In at least one example, if the vehicle 802 has multiple drive systems 814, individual drive systems 814 may be positioned on opposite ends of the vehicle 802 (e.g., the front and the rear, etc.). In at least one example, the drive system(s) 814 can include one or more sensor system(s) 806 to detect conditions of the drive system(s) 814 and/or the surroundings of the vehicle 802. By way of example and not limitation, the sensor system(s) 806 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 814. In some cases, the sensor system(s) 806 on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which may receive and preprocess data from the sensor system(s) 806 and to control operation of the various vehicle systems. In some examples, the drive system controller can include one or more processor(s) and memory communicatively coupled with the one or more processor(s). The memory can store one or more modules to perform various functionalities of the drive system(s) 814. Furthermore, the drive system(s) 814 also include one or more communication connection(s) that enable communication by the respective drive system with one or more other local or remote computing device(s).

The computing device(s) 804 may include one or more processors 818 and one or more memories 820 communicatively coupled with the processor(s) 818. In the illustrated example, the memory 820 of the computing device(s) 804 stores perception systems(s) 822, prediction systems(s) 824, planning systems(s) 826, as well as one or more system controller(s) 1028. The memory 820 may also store data such as sensor data 816 captured or collected by the one or more sensors systems 806, perception data 830 associated with the processed (e.g., classified and segmented) sensor data 816, prediction data 832 associated with one or more predicted state of the environment and/or detected objects within the environment. Though depicted as residing in the memory 820 for illustrative purposes, it is contemplated that the perception systems(s) 822, prediction systems(s) 824, planning systems(s) 826, as well as one or more system controller(s) 828 may additionally, or alternatively, be accessible to the computing device(s) 804 (e.g., stored in a different component of vehicle 802 and/or be accessible to the vehicle 802 (e.g., stored remotely).

The perception system 822 may be configured to perform object detection, segmentation, and/or classification on the sensor data 816. In some examples, the perception system 822 may generate processed perception data 830 from the sensor data 816. The perception data 830 may indicate a presence of objects that are in physical proximity to the vehicle 802 and/or a classification or type of the objects (e.g., car, pedestrian, cyclist, building, tree, road surface, curb, sidewalk, unknown, etc.). In additional and/or alternative examples, the perception system 822 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which are herein incorporated by reference in their entirety.

The prediction system 824 may be configured to determine a track corresponding to an object identified by the perception system 822. For example, the prediction system 824 may be configured to predict a velocity, position, change in trajectory, or otherwise predict the decisions and movement of the identified objects. For example, the prediction system 824 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420,050, which are herein incorporated by reference in their entirety.

The planning system 826 may be configured to determine a route for the vehicle 802 to follow to traverse through an environment. For example, the planning system 826 may determine various routes and paths and various levels of detail based at least in part on the objects detected, the predicted characteristics of the object at future times, and a set of safety requirements corresponding to the current scenario (e.g., combination of objects detected and/or environmental conditions). In some instances, the planning system 826 may determine a route to travel from a first location (e.g., a current location) to a second location (e.g., a target location) in order to avoid an object obstructing or blocking a planned path of the vehicle 802. In some case, a route can be a sequence of waypoints for traveling between the two locations (e.g., the first location and the second location). In some cases, waypoints include streets, intersections, global positioning system (GPS) coordinates, etc. For example, details of path and route planning by the planning system are discussed in U.S. application Ser. Nos. 16/805,118 and 15/632,208, which are herein incorporated by reference, in its entirety.

In at least one example, the computing device(s) 804 may store one or more and/or system controllers 828, which may be configured to control steering, propulsion, braking, safety, emitters, communication, and other systems of the vehicle 802. The system controllers 828 may communicate with and/or control corresponding systems of the drive system(s) 814 and/or other components of the vehicle 802, which may be configured to operate in accordance with a route provided from the planning system 826.

In some implementations, the vehicle 802 may connect to computing device(s) 836 via the network(s) 834. For example, the computing device(s) 836 may receive log data 838 from one or more vehicles 802. The log data 838 may include the sensor data, perception data 830, prediction data 832 and/or a combination thereof. In some cases, the log data 838 may include portion of one or more of the sensor data, perception data 830, prediction data 832.

The computing device 836 may include one or more processors 840 and memory 842 communicatively coupled with the one or more processors 840. In at least one instance, the processor(s) 840 may be similar to the processor(s) 818 and the memory 842 may be similar to the memory 820. In the illustrated example, the memory 842 of the computing device(s) 836 stores the log data 838 received from one or more vehicles 802. The memory 842 may also store parameters 844 associated with objects and/or the vehicle 802 represented in the log data 838, features 846 associated with the environment represented in the log data 838, map data 848, occupations 850 determined from the log data 838, and scenarios 852 generated based at least in part on the occupations 850. The memory 842 may also store a scenario representation component 854, a feature vector component 856, and a scenario storage component 858, each of which may operate in a similar manner to that discussed above with respect to FIGS. 1-7.

The processor(s) 818 of the computing device(s) 804 and the processor(s) 840 of the computing device(s) 836 may be any suitable processor capable of executing instructions to process data and perform operations as described herein. By way of example and not limitation, the processor(s) 818 and 836 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 820 of the computing device(s) 804 and the memory 842 of the computing device(s) 836 are examples of non-transitory computer-readable media. The memory 820 and 842 can store an operating system and one or more software applications, instructions, programs, and/or data to implement the methods described herein and the functions attributed to the various systems. In various implementations, the memory 820 and 842 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 820 and 842 can be implemented as a neural network.

EXAMPLE CLAUSES

A. A system comprising: one or more processors; and one or more non-transitory computer-readable media storing instructions that, when executed by the one or more processors, cause the one or more processors to perform operations comprising: receiving log data associated with a vehicle, the log data representing a scenario of the vehicle operating in an environment; determining, based at least in part on the log data, a plurality of frames of the scenario, wherein individual frames of the plurality of frames comprise respective top-down representations of the scenario at respective times; determining, for individual frames of the plurality of frames, a respective set of discrete areas of the environment based on a respective position of the vehicle in the individual frame, the respective set of discrete areas of the environment being hexagonal areas; determining, for individual frames of the plurality of frames, a respective set of labels for the set of discrete areas for the individual frame based at least in part on the respective position and heading of the vehicle in the individual frame; determining, for individual frames of the plurality of frames, respective agent feature values of agent features for individual discrete areas in the individual frame; determining a feature vector for the scenario based at least in part by aggregating agent feature values of the individual frames based on the labels for the discrete areas for the frame; and determining a second scenario associated with the scenario, by comparing the feature vector to a second feature vector using a threshold distance.

B. The system as recited in claim A, wherein: the determining, for individual frames of the plurality of frames, of the respective set of labels for the discrete areas for the individual frame determines labels for a center discrete area and one or more concentric rings of discrete areas around the center discrete area; a first discrete area is a first center discrete area in the determining of the labels in a first individual frame of the plurality of frames based on a first position of the vehicle in the first individual frame; and a second discrete area is a second center discrete area in the determining of the labels in a second individual frame of the plurality of frames based on a second position of the vehicle in the second individual frame.

C. The system as recited in claim A, wherein the agent features include at least one of: an agent presence feature; an agent class feature; an agent speed feature; an agent heading feature; a longitudinal agent speed feature; a latitudinal agent speed feature; an agent acceleration feature; or an agent yaw rate feature.

D. The system as recited in claim A, the operations further comprising: determining, for individual frames of the plurality of frames, respective road feature values of road features for individual discrete areas; and determining the feature vector for the scenario at least in part by aggregating road feature values of the individual frames based on the labels for the discrete areas for the frames.

E. The system as recited in claim D, wherein the road features include at least one of: a crosswalk feature; a drivable surface feature; a before intersection feature; an after intersection feature; an intersection feature; a parking space feature; a speed bump feature; a driveway feature; a road signage feature; or a road marking feature.

F. A method comprising: receiving log data associated with a vehicle, the log data representing a scenario of the vehicle operating in an environment; determining, based at least in part on the log data, a frame of the scenario; determining, for the frame of the scenario, a set of discrete areas of the environment based on a position of the vehicle in the frame; determining, for the frame of the scenario, a set of labels for the discrete areas of the frame based at least in part on the position and a heading of the vehicle in the frame; determining, for the frame of the scenario, respective agent feature values of agent features for agents in individual discrete areas of the discrete areas of the frame; determining a feature vector for the scenario based at least in part on agent feature values of the frame and based at least in part on the labels for the discrete areas of the frame; and performing an action based at least in part on the feature vector.

G. The method of claim F, wherein the frame comprises a top-down representations of the scenario at a corresponding time.

H. The method of claim F, wherein performing the action comprises at least one of: determining a second scenario associated with the scenario, by comparing the feature vector to a second feature vector using a threshold distance; or outputting a vehicle control action associated with the vehicle.

I. The method of claim F, further comprising: determining, based at least in part on the log data, a plurality of additional frames of the scenario, wherein a plurality of frames of the scenario include the frame and the plurality of additional frames; determining, for individual additional frames of the plurality of frames, a respective set of additional discrete areas of the environment based on a respective position of the vehicle in the individual additional frame; determining, for individual additional frames of the plurality of frames, a respective set of labels for the discrete areas of the individual additional frame based at least in part on the respective position and a respective heading of the vehicle in the individual additional frame; and determining, for individual additional frames of the plurality of frames, respective agent feature values of agent features for agents in individual discrete areas of the discrete areas of the individual additional frame; and wherein determining the feature vector for the scenario further comprises aggregating agent feature values of the individual additional frames to the feature vector based on the labels for the discrete areas of the individual additional frames.

J. The method of claim I wherein: the set of discrete areas of the environment are hexagonal areas; the determining, for individual frames of the plurality of frames, of the respective set of labels for the discrete areas for the individual frame determines labels for a center discrete area and one or more concentric rings of discrete areas around the center discrete area; a first discrete area is a first center discrete area in the determining of the labels in a first individual frame of the plurality of frames based on a first position of the vehicle in the first individual frame; and a second discrete area is a second center discrete area in the determining of the labels in a second individual frame of the plurality of frames based on a second position of the vehicle in the second individual frame.

K. The method of claim I, further comprising: determining, for individual frames of the plurality of frames, respective road feature values of road features for individual discrete areas; and determining the feature vector for the scenario at least in part by aggregating road feature values of the individual frames based on the labels for the discrete areas for the frames.

L. The method of claim K, wherein the road features include at least one of: a crosswalk feature; a drivable surface feature; a before intersection feature; an after intersection feature; an intersection feature; a parking space feature; a speed bump feature; a driveway feature; a road signage feature; or a road marking feature.

M. The method of claim F, wherein the agent features include at least one of: an agent presence feature; an agent class feature; an agent speed feature; an agent heading feature; a longitudinal agent speed feature; a latitudinal agent speed feature; an agent acceleration feature; or an agent yaw rate feature.

N. One or more non-transitory computer-readable media storing processor-executable instructions that, when executed by one or more processors, cause the one or more processors to perform operations comprising: receiving log data associated with a vehicle, the log data representing a scenario of the vehicle operating in an environment; determining, based at least in part on the log data, a frame of the scenario; determining, for the frame of the scenario, a set of discrete areas of the environment based on a position of the vehicle in the frame; determining, for the frame of the scenario, a set of labels for the discrete areas for the frame based at least in part on the position and a heading of the vehicle in the frame; determining, for the frame of the scenario, respective agent feature values of agent features for agents in individual discrete areas of the discrete areas of the frame; determining a feature vector for the scenario based at least in part on agent feature values of the frame and based at least in part on the labels for the discrete areas for the frame; and performing an action based at least in part on the feature vector.

O. The one or more non-transitory computer-readable medium of claim N, wherein the frame comprises a top-down representations of the scenario at a corresponding time.

P. The one or more non-transitory computer-readable medium of claim N, wherein performing the action comprises at least one of: determining a second scenario associated with the scenario, by comparing the feature vector to a second feature vector using a threshold distance; or outputting a vehicle control action associated with the vehicle.

Q. The one or more non-transitory computer-readable medium of claim N, further comprising: determining, based at least in part on the log data, a plurality of additional frames of the scenario, wherein a plurality of frames of the scenario include the frame and the plurality of additional frames; determining, for individual additional frames of the plurality of frames, a respective set of additional discrete areas of the environment based on a respective position of the vehicle in the individual additional frame; determining, for individual additional frames of the plurality of frames, a respective set of labels for the discrete areas of the individual additional frame based at least in part on the respective position and a respective heading of the vehicle in the individual additional frame; and determining, for individual additional frames of the plurality of frames, respective agent feature values of agent features for agents in individual discrete areas of the discrete areas of the individual additional frame; and wherein determining the feature vector for the scenario further comprises aggregating agent feature values of the individual additional frames to the feature vector based on the labels for the discrete areas of the individual additional frames.

R. The one or more non-transitory computer-readable medium of claim Q, wherein: the set of discrete areas of the environment are hexagonal areas; the determining, for individual frames of the plurality of frames, of the respective set of labels for the discrete areas for the individual frame determines labels for a center discrete area and one or more concentric rings of discrete areas around the center discrete area; a first discrete area is a first center discrete area in the determining of the labels in a first individual frame of the plurality of frames based on a first position of the vehicle in the first individual frame; and a second discrete area is a second center discrete area in the determining of the labels in a second individual frame of the plurality of frames based on a second position of the vehicle in the second individual frame.

S. The one or more non-transitory computer-readable medium of claim Q, the operations further comprising: determining, for individual frames of the plurality of frames, respective road feature values of road features for individual discrete areas; and determining the feature vector for the scenario at least in part by aggregating road feature values of the individual frames based on the labels for the discrete areas for the frames.

T. The one or more non-transitory computer-readable medium of claim N, wherein the agent features include at least one of: an agent presence feature; an agent class feature; an agent speed feature; an agent heading feature; a longitudinal agent speed feature; a latitudinal agent speed feature; an agent acceleration feature; or an agent yaw rate feature.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of agents and other objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing instructions that, when executed by the one or more processors, cause the one or more processors to perform operations comprising:
receiving log data associated with a vehicle, the log data representing a scenario of the vehicle operating in an environment;
determining, based at least in part on the log data, a plurality of frames of the scenario, wherein individual frames of the plurality of frames comprise respective top-down representations of the scenario at respective times;
determining, for individual frames of the plurality of frames, a respective set of discrete areas of the environment based on a respective position of the vehicle in the individual frame, the respective set of discrete areas of the environment being hexagonal areas;
determining, for individual frames of the plurality of frames, a respective set of labels for the set of discrete areas for the individual frame based at least in part on the respective position and heading of the vehicle in the individual frame;
determining, for individual frames of the plurality of frames, respective agent feature values of agent features for individual discrete areas in the individual frame;
determining a feature vector representation of the scenario by aggregating agent feature values of the individual frames based on the labels for the discrete areas for the frame; and
determining a second scenario by comparing the feature vector representation of the scenario to a second feature vector representation of the second scenario using a threshold distance.

2. The system as recited in claim 1, wherein:
the determining, for individual frames of the plurality of frames, of the respective set of labels for the discrete areas for the individual frame determines labels for a center discrete area and one or more concentric rings of discrete areas around the center discrete area;
a first discrete area is a first center discrete area in the determining of the labels in a first individual frame of the plurality of frames based on a first position of the vehicle in the first individual frame; and
a second discrete area is a second center discrete area in the determining of the labels in a second individual frame of the plurality of frames based on a second position of the vehicle in the second individual frame.

3. The system as recited in claim 1, wherein the agent features include at least one of:
an agent presence feature;
an agent class feature;
an agent speed feature;
an agent heading feature;
a longitudinal agent speed feature;
a latitudinal agent speed feature;
an agent acceleration feature; or
an agent yaw rate feature.

4. The system as recited in claim 1, the operations further comprising:

determining, for individual frames of the plurality of frames, respective road feature values of road features for individual discrete areas; and
determining the feature vector representation of the scenario at least in part by aggregating road feature values of the individual frames based on the labels for the discrete areas for the frames.

5. The system as recited in claim 4, wherein the road features include at least one of:
a crosswalk feature;
a drivable surface feature;
a before intersection feature;
an after intersection feature;
an intersection feature;
a parking space feature;
a speed bump feature;
a driveway feature;
a road signage feature; or
a road marking feature.

6. A method comprising:
receiving log data associated with a vehicle, the log data representing a scenario of the vehicle operating in an environment;
determining, based at least in part on the log data, a frame of the scenario;
determining, for the frame of the scenario, a set of discrete areas of the environment based on a position of the vehicle in the frame;
determining, for the frame of the scenario, a set of labels for the discrete areas of the frame based at least in part on the position and a heading of the vehicle in the frame;
determining, for the frame of the scenario, respective agent feature values of agent features for agents in individual discrete areas of the discrete areas of the frame;
determining a feature vector representation of the scenario based at least in part on agent feature values of the frame and based at least in part on the labels for the discrete areas of the frame; and
determining a second scenario by comparing the feature vector representation of the scenario to a second feature vector representation of the second scenario using a threshold distance.

7. The method of claim 6, wherein the frame comprises a top-down representation of the scenario at a corresponding time.

8. The method of claim 6,
further comprising performing simulation testing of the vehicle in the second scenario.

9. The method of claim 6, further comprising:
determining, based at least in part on the log data, a plurality of additional frames of the scenario, wherein a plurality of frames of the scenario include the frame and the plurality of additional frames;
determining, for individual additional frames of the plurality of frames, a respective set of additional discrete areas of the environment based on a respective position of the vehicle in the individual additional frame;
determining, for individual additional frames of the plurality of frames, a respective set of labels for the discrete areas of the individual additional frame based at least in part on the respective position and a respective heading of the vehicle in the individual additional frame; and
determining, for individual additional frames of the plurality of frames, respective agent feature values of agent features for agents in individual discrete areas of the discrete areas of the individual additional frame; and wherein determining the feature vector representation of the scenario further comprises aggregating agent feature values of the individual additional frames to the feature vector based on the labels for the discrete areas of the individual additional frames.

10. The method of claim 9, wherein:

the set of discrete areas of the environment are hexagonal areas;

the determining, for individual frames of the plurality of frames, of the respective set of labels for the discrete areas for the individual frame determines labels for a center discrete area and one or more concentric rings of discrete areas around the center discrete area;

a first discrete area is a first center discrete area in the determining of the labels in a first individual frame of the plurality of frames based on a first position of the vehicle in the first individual frame; and a second discrete area is a second center discrete area in the determining of the labels in a second individual frame of the plurality of frames based on a second position of the vehicle in the second individual frame.

11. The method of claim 9, further comprising:

determining, for individual frames of the plurality of frames, respective road feature values of road features for individual discrete areas; and determining the feature vector representation of the scenario at least in part by aggregating road feature values of the individual frames based on the labels for the discrete areas for the frames.

12. The method of claim 11, wherein the road features include at least one of:

a crosswalk feature;
a drivable surface feature;
a before intersection feature;
an after intersection feature;
an intersection feature;
a parking space feature;
a speed bump feature;
a driveway feature;
a road signage feature; or
a road marking feature.

13. The method of claim 6, wherein the agent features include at least one of:

an agent presence feature;
an agent class feature;
an agent speed feature;
an agent heading feature;
a longitudinal agent speed feature;
a latitudinal agent speed feature;
an agent acceleration feature; or
an agent yaw rate feature.

14. One or more non-transitory computer-readable media storing processor-executable instructions that, when executed by one or more processors, cause the one or more processors to perform operations comprising:

receiving log data associated with a vehicle, the log data representing a scenario of the vehicle operating in an environment;

determining, based at least in part on the log data, a frame of the scenario;

determining, for the frame of the scenario, a set of discrete areas of the environment based on a position of the vehicle in the frame;

determining, for the frame of the scenario, a set of labels for the discrete areas for the frame based at least in part on the position and a heading of the vehicle in the frame;

determining, for the frame of the scenario, respective agent feature values of agent features for agents in individual discrete areas of the discrete areas of the frame;

determining a feature vector representation of the scenario based at least in part on agent feature values of the frame and based at least in part on the labels for the discrete areas for the frame; and determining a second scenario by comparing the feature vector representation of the scenario to a second feature vector representation of the second scenario using a threshold distance.

15. The one or more non-transitory computer-readable media of claim 14, wherein the frame comprises a top-down representation of the scenario at a corresponding time.

16. The one or more non-transitory computer-readable media of claim 14, further comprising performing simulation testing of the vehicle in the second scenario.

17. The one or more non-transitory computer-readable media of claim 14, further comprising:

determining, based at least in part on the log data, a plurality of additional frames of the scenario, wherein a plurality of frames of the scenario include the frame and the plurality of additional frames;

determining, for individual additional frames of the plurality of frames, a respective set of additional discrete areas of the environment based on a respective position of the vehicle in the individual additional frame;

determining, for individual additional frames of the plurality of frames, a respective set of labels for the discrete areas of the individual additional frame based at least in part on the respective position and a respective heading of the vehicle in the individual additional frame; and determining, for individual additional frames of the plurality of frames, respective agent feature values of agent features for agents in individual discrete areas of the discrete areas of the individual additional frame; and wherein determining the feature vector representation of the scenario further comprises aggregating agent feature values of the individual additional frames to the feature vector based on the labels for the discrete areas of the individual additional frames.

18. The one or more non-transitory computer-readable media of claim 17, wherein:

the set of discrete areas of the environment are hexagonal areas;

the determining, for individual frames of the plurality of frames, of the respective set of labels for the discrete areas for the individual frame determines labels for a center discrete area and one or more concentric rings of discrete areas around the center discrete area;

a first discrete area is a first center discrete area in the determining of the labels in a first individual frame of the plurality of frames based on a first position of the vehicle in the first individual frame; and a second discrete area is a second center discrete area in the determining of the labels in a second individual frame of the plurality of frames based on a second position of the vehicle in the second individual frame.

19. The one or more non-transitory computer-readable media of claim 17, the operations further comprising:
   determining, for individual frames of the plurality of frames, respective road feature values of road features for individual discrete areas; and
   determining the feature vector representation of the scenario at least in part by aggregating road feature values of the individual frames based on the labels for the discrete areas for the frames.

20. The one or more non-transitory computer-readable media of claim 14, wherein the agent features include at least one of:
   an agent presence feature;
   an agent class feature;
   an agent speed feature;
   an agent heading feature;
   a longitudinal agent speed feature;
   a latitudinal agent speed feature;
   an agent acceleration feature; or
   an agent yaw rate feature.

* * * * *